(12) United States Patent
Isozaki et al.

(10) Patent No.: US 6,605,883 B2
(45) Date of Patent: Aug. 12, 2003

(54) MULTI-PHASE FLAT-TYPE PM STEPPING MOTOR AND DRIVING CIRCUIT THEREOF

(75) Inventors: Kouki Isozaki, Kiryu (JP); Yuichi Tsuda, Nitsuta-gun (JP); Junji Rokunohe, Kiryu (JP)

(73) Assignee: Japan Servo Co., Ltd., Tokyo-to (JP)

( * ) Notice: Subject to any disclaimer, the term of this patent is extended or adjusted under 35 U.S.C. 154(b) by 0 days.

(21) Appl. No.: 10/125,381

(22) Filed: Apr. 19, 2002

(65) Prior Publication Data

US 2002/0153792 A1 Oct. 24, 2002

(30) Foreign Application Priority Data

Apr. 20, 2001 (JP) ........................ 2001-123388
Apr. 27, 2001 (JP) ........................ 2001-132981

(51) Int. Cl.$^7$ .................... H02K 7/09; H02K 1/22; H02K 37/00; H02Q 21/10
(52) U.S. Cl. ................. 310/49 R; 310/156.32; 310/156.36; 310/268; 310/114; 310/90.5
(58) Field of Search ................ 310/49 R, 268, 310/499, 156.36, 156.37

(56) References Cited

U.S. PATENT DOCUMENTS

| | | | | |
|---|---|---|---|---|
| 3,988,024 A | * | 10/1976 | Watanabe | ............ 310/39 |
| 4,082,971 A | * | 4/1978 | Miyake | ............ 310/114 |
| 4,207,483 A | | 6/1980 | Baer | |
| 4,551,645 A | * | 11/1985 | Tkahashi | ............ 310/46 |
| 4,672,247 A | | 6/1987 | Madsen et al. | |
| 4,745,312 A | | 5/1988 | Nagasaka | |
| 4,922,145 A | * | 5/1990 | Shtipelman | ............ 310/49 R |
| 5,128,570 A | | 7/1992 | Isozaki | |
| 5,218,251 A | * | 6/1993 | Allwine | ............ 310/49 R |
| 5,289,064 A | | 2/1994 | Sakamoto | |
| 5,334,899 A | * | 8/1994 | skybyk | ............ 310/268 |
| 5,386,161 A | | 1/1995 | Sakamoto | |
| 5,587,617 A | * | 12/1996 | Dunfield | ............ 310/90.5 |
| 5,619,087 A | * | 4/1997 | Sakai | ............ 310/268 |
| 5,854,526 A | | 12/1998 | Sakamoto | |
| 5,874,795 A | | 2/1999 | Sakamoto | |
| 5,892,307 A | * | 4/1999 | Povlovich | ............ 310/68 |
| 6,153,953 A | | 11/2000 | Isozaki et al. | |
| 6,160,330 A | | 12/2000 | Sakamoto | |
| 6,259,176 B1 | | 7/2001 | Isozaki et al. | |
| 6,373,162 B1 | * | 4/2002 | Liang | ............ 310/156.53 |

* cited by examiner

*Primary Examiner*—Nestor Ramirez
*Assistant Examiner*—Iraj A Mohandesi
(74) *Attorney, Agent, or Firm*—Oblon, Spivak, McClelland, Maier & Neustadt, P.C.

(57) ABSTRACT

Disclosed is a multi-phase flat-type PM stepping motor comprising a first motor unit having a first stator unit and a first rotor unit, and a second motor unit having a second stator unit and a second rotor unit. The first stator unit has a plurality of air-core coils that are radially arranged on a first isolating magnetic disc. The first rotor unit has a plurality of permanent magnets that are alternatively magnetized in N-pole and S-pole and radially arranged on a second magnetic disc with a predetermined air gap with respect to the coil surface of the first stator unit. In the same manner, the second stator unit has a plurality of air-core coils that are radially arranged on a third isolating magnetic disc, and the second rotor unit has a plurality of permanent magnets arranged on a fourth magnetic disc. The first and second motor units are coaxial and symmetric with each other about a non-magnetic disc arranged therebetween.

17 Claims, 27 Drawing Sheets

MULTI-PHASE FLAT-TYPE PM STEPPING MOTOR AND DRIVING CIRCUIT THEREOF

BACKGROUND OF THE INVENTION

1. The Field of the Invention

The present invention relates to a construction of a multi-phase flat-type PM (Permanent Magnet) stepping motor and a driving circuit thereof. Particularly, the present invention relates to an improvements of a high-resolution and high-accuracy PM stepping motor and a driving circuit thereof that are suitable for OA equipment, which requires accurate positioning during high speed operation, such as a printer, a high speed facsimile or a PPC copying machine.

2. Prior Art

FIG. 23 is a longitudinal sectional side view of one example of this kind of conventional multi-phase flat-type PM stepping motor (referred to as a "motor" in the following description), and FIG. 24 is a front view of the main portion from a XXIV—XXIV line in FIG. 23.

In the drawing, a reference 1 denotes a stator, 2 denotes air-core coils and 3 denotes a magnetic disc on which permanent magnets 4 are attached. The magnetic disc 3 is fixed to a rotation axis 8, and this rotation axis 8 is rotatably supported by bearings 7 fixed to the stator 1 through brackets 1B. The permanent magnets 4 alternatively magnetized in N-pole and S-pole that are radially arranged. Each of the permanent magnets 4 constitutes a magnetic pole. The pitch of the permanent magnets 4 corresponds to that of the coils 2.

FIG. 25 shows a connection example of a conventional 6-phase motor with twenty-four coils, and FIG. 26 shows a driving circuit for the connection of FIG. 25.

In FIG. 25, Φ1 through Φ24 denote the coils, A through F denote terminals at one end side of the coils connected in series for each of the phases and A' through F' denote terminals at the other end side of the coils.

In FIG. 26, T1 through T24 are switching elements such as switching transistors to excite the respective coils, ΦAA' through ΦFF' are the coil groups in which the coils of the same phase are serially connected as shown in FIG. 25. A reference V represents a power supply.

Four switching elements form bridge connection for each phase and each terminal of the coil groups is connected to the intermediate point of the serial connection. In other words, the first switching element T1 and the second switching element T13 are connected, the third switching element T2 and the fourth switching element T14 are connected, and the terminals A and A' of the coil group of the first phase shown in FIG. 25 are connected to the connection points of the switching elements.

In this connection, when the first switching element T1 and the fourth switching element T14 are conducting, an electric current passes in a direction EC1 from the terminal A to the other terminal A', which energizes the coil group of the first phase. In this way, the motor rotates as the respective phases are sequentially excited by bringing the respective switching elements into conduction in order.

FIG. 27 is a connection diagram of a 10-phase motor that includes forty coils and FIG. 28 shows a driving circuit for the coils shown in FIG. 27. In FIG. 27, Φ1 through Φ40 denote the coils, A through T denote terminals in one end side of the coils connected in series for each of the phases and A' through T' denote terminals in the other end side of the coils. A reference V represents a power supply.

In FIG. 28, T1 through T40 are switching elements such as switching transistors to excite the respective coils, ΦAA' through ΦTT' are the coil groups in which the coils of the same phase are serially connected as shown in FIG. 27. Four switching elements form bridge connection for each phase, each coil group is connected to the intermediate points of the bridge connection.

In other words, the first switching element T1 and the second switching element T21 are serially connected and the third switching element T2 and the fourth switching element T22 are serially connected. The terminals A and A' of the first phase coil group are connected to the connection points of the switching elements.

In this connection, when the first switching element T1 and the fourth switching element T22 are conducting, an electric current passes in a direction EC1 from the terminal A to the other terminal A', which energizes the coil group of the first phase. In this way, the motor rotates as the respective phases are sequentially excited by bringing the respective switching elements into conduction in order.

A step angle is a rotation angle of one step rotation of the stepping motor when the coil groups are sequentially excited phase by phase and it is determined by the structure of the motor. Accordingly, it is necessary to minimize the step angle to obtain a motor having high resolution and a good control performance.

The step angle $\theta$ of the multi-phase flat-type stepping motor is represented by $\theta = 360°/(m \times Pr)$, where m is phase number and Pr is a total number of magnetic poles of the rotor including N-poles and S-poles. Therefore, it is necessary to increase the phase number m or the magnetic pole number Pr in order to decrease the step angle $\theta$.

In order to increase the phase number, it is required to increase the number of coils on the stator. For instance, while a 6-phase motor operates with two coils per phase (12 coils in total) in principle, the stable operation requires 24 coils. In the same manner, a 10-phase motor requires 40 coils in total.

However, since the coil has a predetermined width, when all the coils are arranged in the same magnetic disc as the prior art, a number of the coil is limited, and the number of phase cannot be enough large.

On the other hand, the magnetic pole number Pr of the rotor should be increased in order to decrease the step angle without increasing the phase number. However, the magnetic pole number Pr of a rotor is fixed by precision ability of a magnetizing device and cannot be enough large. The minimum step angle of the conventional 6-phase flat-type PM stepping motor was 15°.

A micro-step driving is needed to get a resolution higher than the step angle determined by the phase number and the magnetic pole number. However, since the stop position of the rotor is determined by the relative values of electric current applied to the respective phases under the micro-step driving, it was difficult to improve the accuracy of the resolution due to variation of the values of electric current applied to the respective phases, variation of characteristics of switching elements, or the like. Further, since a complicated driving circuit was need for the micro-step driving, there was a problem that the cost rises.

Further, the conventional driving circuits shown in FIGS. 26 and 28 require four switching element for each phase. Therefore, 24 switching elements are needed for driving the 6-phase motor and 40 switching elements are needed for driving the 10-phase motor. This complicates the driving circuit and increases the cost thereof.

It is the fact that the multi-phase flat-type stepping motor is hardly available in the market due to the above-described reasons.

SUMMARY OF THE INVENTION

An object of the present invention is to solve the above described problems of the conventional motor and to provide a high-resolution, high-accuracy multi-phase flat-type PM stepping motor with employing a multi-unit construction. Another object of the present invention is to provide a simple and low-cost driving circuit for the multi-phase flat-type PM stepping motor.

A multi-phase flat-type PM stepping motor of the present invention described in claim 1 comprises a first motor unit that comprises a first stator unit and a first rotor unit, and a second motor unit that comprises a second stator unit and a second rotor unit. The first stator unit has a plurality of air-core coils that are radially arranged on a first isolating magnetic disc. The first rotor unit has a plurality of permanent magnets that are alternatively magnetized in N-pole and S-pole and radially arranged on a second magnetic disc with a predetermined air gap with respect to the coil surface of the first stator unit. In the same manner, the second stator unit has a plurality of air-core coils that are radially arranged on a third isolating magnetic disc, and the second rotor unit has a plurality of permanent magnets arranged on a fourth magnetic disc. The first and second motor units are coaxial and symmetric with each other about a non-magnetic disc arranged therebetween.

The motor defined in claim 2 is characterized in that the coils arranged on the first stator unit are deviated from the coils arranged on the second stator unit by ½ of the coil arrangement angular pitch, and the permanent magnets arranged on the first rotor unit are deviated from the permanent magnets arranged on the second rotor unit by ¼ of the angular pitch of the magnetic poles having the same polarity.

In such a case, as defined in claim 3, the total number Pr of the N-poles and S-poles of each rotor unit preferably satisfies the following equation:

$$Pr=m\pm2$$

where m is a phase number.

Further, as described in claim 4 or 5, it is suitable that the phase number of the multi-phase flat-type PM stepping motor is 6-phase or 10-phase.

Further, a driving circuit for the multi-phase flat-type PM stepping motor according to the present invention is characterized in that the respective opposite air-core coils are serially connected to form a plurality of coil groups, and terminals at one side of the coil groups are connected to each other for each of the first and second stator units to permit plural phase excitation as defined in claim 6.

Further, as defined in claim 7, the connection point of the coil groups arranged on the first stator unit may be connected to the connection point of the coil groups arranged on the second stator unit.

Still further, as defined in claim 8, the driving circuit may be constructed as that terminals at the side opposite to the connection point of the coil groups are connected to connection points of serially connected switching elements, respectively.

A multi-phase flat-type PM stepping motor described in claim 9 comprises a first motor unit having a first stator unit and a first rotor unit and a second motor unit having a second stator unit and a second rotor unit. The first stator unit provides a plurality of magnetic poles that are radially arranged on a first isolating magnetic disc, each of the magnetic poles having pole teeth on the top thereof and being wound by a coil. The first rotor unit has a plurality of permanent magnets that are alternatively magnetized in N-pole and S-pole and radially arranged on a second magnetic disc at the pitch corresponding to the pitch of the pole teeth with a predetermined air gap with respect to the magnetic pole surface of the first stator unit. In the same manner, the second stator unit provides a plurality of magnetic poles with pole teeth and coils wound around the magnetic poles, and the second rotor unit has a plurality of permanent magnets. The first and second motor units are coaxial and symmetric with each other about a non-magnetic disc arranged therebetween.

In such a case, as described in claim 10, it is preferable that each of the pole teeth is a projection whose sectional shape is rectangular and that a predetermined number of the pole teeth are radially formed on each of the magnetic poles at a predetermined pitch.

The motor defined in claim 11 is characterized in that the magnetic poles arranged on the first stator unit are deviated from the magnetic poles arranged on the second stator unit by ½ of the coil arrangement angular pitch, and the permanent magnets arranged on the first rotor unit are deviated from the permanent magnets arranged on the second rotor unit by ¼ of the angular pitch of the magnetic poles having the same polarity.

Further, as defined in claim 12, the total number Pr of the N-poles and S-poles of each rotor unit preferably satisfies the following equation:

$$Pr=m(4n+1)\pm2$$

where m is a phase number that is equal to or larger than 6, and n is an integer equal to or larger than 1.

Further, as described in claim 13 or 14, it is suitable that the phase number of the multi-phase flat-type PM stepping motor is 6-phase or 10-phase.

Further, a driving circuit for the multi-phase flat-type PM stepping motor according to the present invention is characterized in that the respective opposite coils are serially connected to form a plurality of coil groups, and terminals at one side of the coil groups are connected to each other for each of the first and second stator units to permit plural phase excitation as defined in claim 15.

Further, as defined in claim 16, the connection point of the coil groups arranged on the first stator unit may be connected to the connection point of the coil groups arranged on the second stator unit.

Still further, as defined in claim 17, the driving circuit may be constructed as that terminals at the side opposite to the connection point of the coil groups are connected to connection points of serially connected switching elements, respectively.

BRIEF DESCRIPTION OF THE DRAWINGS

FIG. 3A shows a first rotor unit, FIG. 3B shows a second rotor unit and FIG. 3C shows a relationship between the permanent magnets of the first and second rotor units;

FIG. 19A is a front view of the rotor unit, FIG. 19B is a perspective view showing the relationship between the first and second rotor units, FIG. 3C is a developed view of the permanent magnets of the first and second rotor units;

DESCRIPTION OF THE PREFERRED EMBODIMENTS

Figure 1:
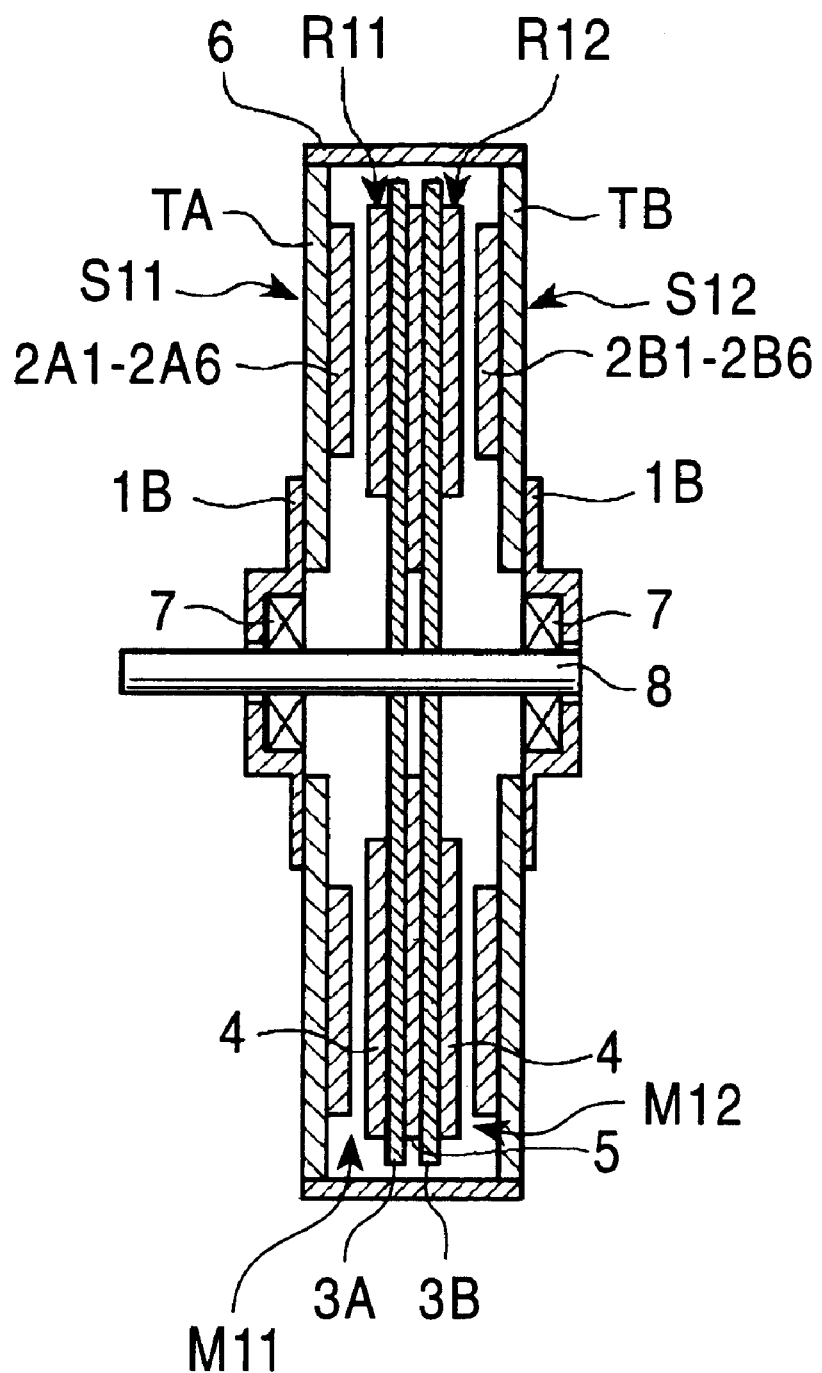
FIG. 1 is a vertical sectional side view showing a schematic construction of a 6-phase flat-type PM stepping motor according to a first embodiment.

Preferred embodiments of the multi-phase flat-type PM stepping motor (referred to as a "motor") and driving circuit thereof according to the present invention will be described in detail with reference to the drawings. In the drawings, the construction elements corresponding to the elements of the prior art have the same reference numbers and will not be described in detail.

First Embodiment

FIG. 1 is a vertical sectional side view showing schematic constitution of a multi-phase flat-type PM stepping motor according to a first embodiment. The multi-phase flat-type PM stepping motor of the first embodiment is a 6-phase motor that is constructed as a combination of first and second 3-phase motor units M11 and M12 having six coils, respectively.

The first motor unit M11 consists of a first stator unit S11 having a plurality of air-core coils 2A1 through 2A6 that are radially arranged on a first isolating magnetic disc TA, and a first rotor unit R11, which is rotatably supported, having a plurality of permanent magnets 4 that are alternatively magnetized in N-pole and S-pole and radially arranged on a second magnetic disc 3A with a predetermined air gap with respect to the coil surface of the first stator unit S11.

In the same manner, the second motor unit M12 consists of a second stator unit S12 having a plurality of air-core coils 2B1 through 2B6 that are radially arranged on a third isolating magnetic disc TB and a second rotor unit R12, which is rotatably supported, having a plurality of permanent magnets 4 on a fourth magnetic disc 3B.

The first and second motor units M11 and M12 are coaxial and symmetric with each other about a non-magnetic disc 5 arranged therebetween. In other words, the first rotor unit R11 and the second rotor unit R12 are fixed coaxially and symmetrically. The non-magnetic disc 5 is sandwiched between the magnetic discs 3A and 3B. The permanent magnets 4 arranged on the first and second rotor units R11 and R12 face the first and second stator units S11 and S12 with a predetermined air gaps, respectively.

The first rotor unit R11 and the second rotor unit R12 are fixed to a rotation axis 8 in the center areas thereof. The permanent magnets 4 that are alternatively magnetized in N-pole and S-pole are radially arranged on the second and fourth magnetic discs 3A and 3B. Size and pitch of the permanent magnets 4 correspond to that of the coils arranged on the stator units. The respective N-poles and S-poles are magnetic poles of the rotor unit.

Circumference edges of the magnetic discs TA and TB of the first stator unit S11 and the second stator unit S12 are fixed by a circumference ring 6. A pair of brackets 1B are fixed to the center of the magnetic discs TA and TB, respectively, and the rotation axis 8 is supported by a pair of bearings 7 supported by the brackets 1B.

Figure 2:
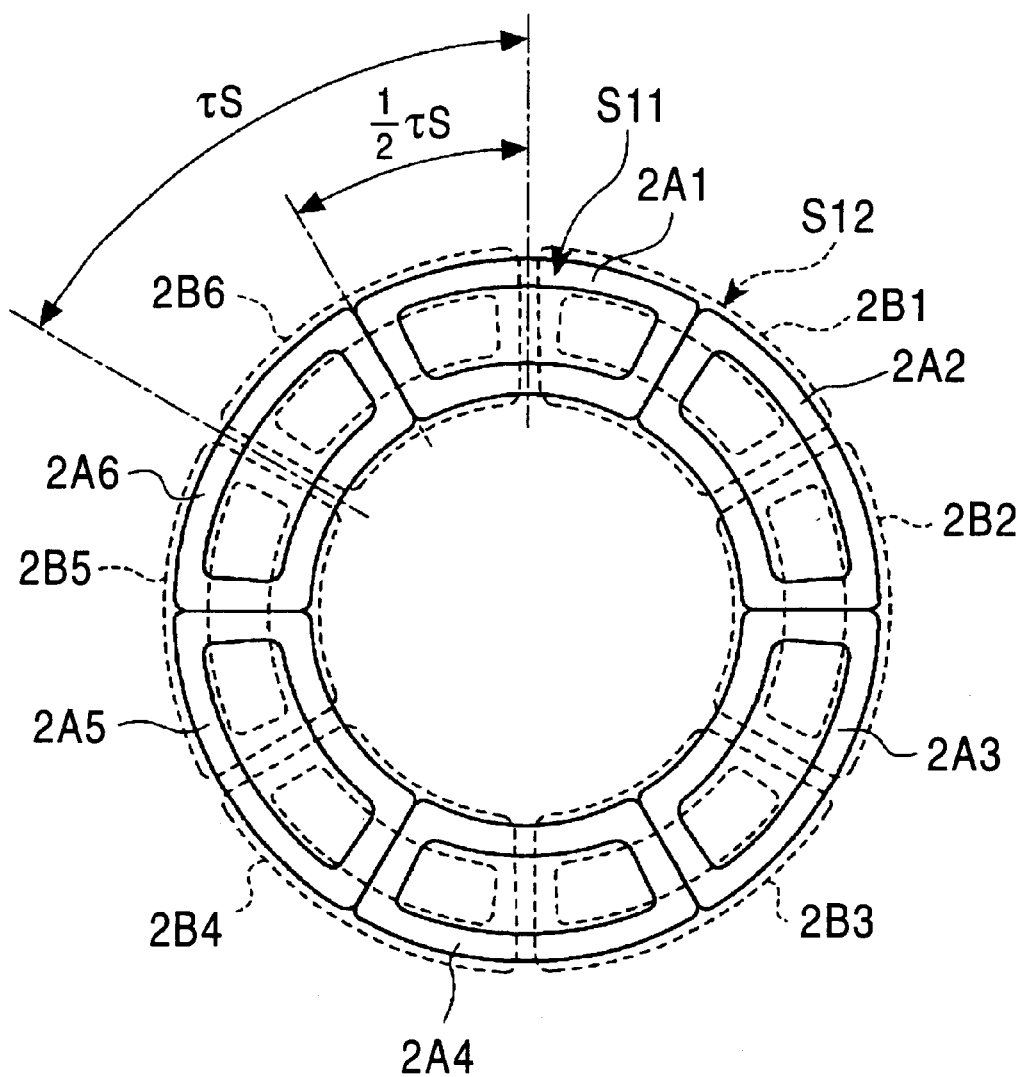
FIG. 2 is a front view showing an arrangement of coils of two stator units included in the motor of the first embodiment.

FIG. 2 is a front view showing an arrangement of the air-core coils 2A1–2A6 and 2B1–2B6 of the stator units S11 and S12 included in the motor of the first embodiment. In the drawing, the air-core coils 2A1–2A6 arranged on the first stator unit S11 are shown by solid lines, while the air-core coils 2B1–2B6 arranged on the second stator unit S12 are shown by dotted lines. All the air-core coils 2A1–2A6 and 2B1–2B6 are the same in a shape and a winding number.

Assuming that the angular pitch between the air-core coils arranged in the same stator unit is equal to τS, the deviation angle between the air-core coil arranged on the first stator unit S11 and the air-core coil arranged on the second stator unit S12 is equal to (½)τS.

Figure 3A:
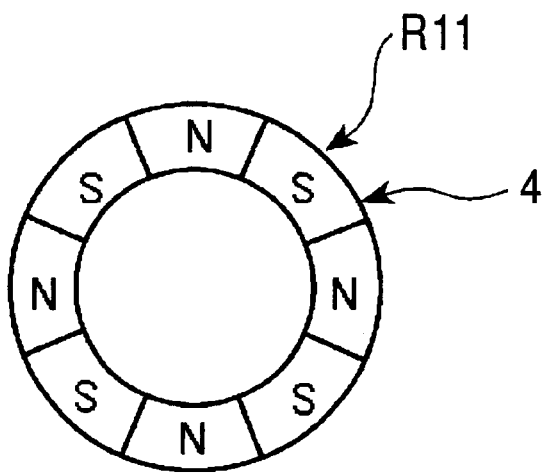
FIGS. 3A–3C show arrangements of permanent magnets of rotor units included in the motor of the first embodiment.
Figure 3B:
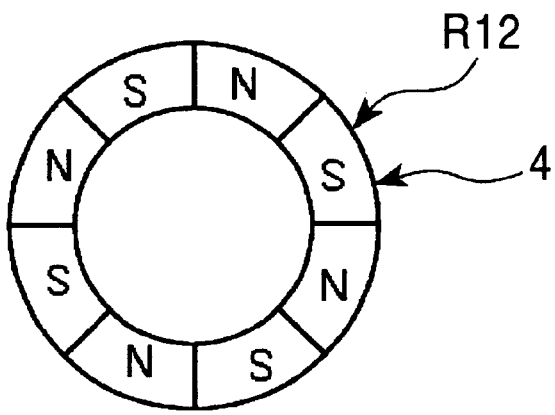
Figure 3C:
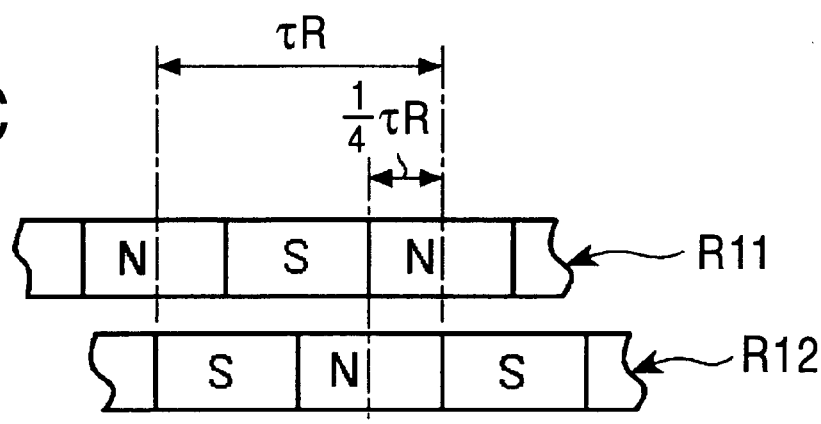

FIGS. 3A and 3B show the permanent magnets 4 corresponding to the stator structure shown in FIG. 2. FIG. 3A shows the first rotor unit R11, FIG. 3B shows the second rotor unit R12 and FIG. 3C shows a relationship between the permanent magnets 4 of the first and second rotor units R11 and R12. As shown in FIGS. 3A and 3B, each of the first and second rotor units R11 and R12 is provided with four pairs of N-poles and S-poles that are radially arranged so as to correspond to the arrangement of the air-core coils of the stator unit. Further, a magnetic pole of the first rotor unit R11 and a magnetic pole of the second rotor unit R12 are deviated from each other by ¼ of the pitch τR between the closest pair of the magnetic poles having the same polarity as shown in FIG. 3C.

The magnetic pole number Pr that is a total number of N-poles and S-poles of each rotor unit satisfies the following equation (1);

$$Pr=m\pm 2 \quad (1)$$

where m is phase number of the motor. Since the first embodiment provides a 6-phase motor, m=6. Accordingly, Pr equals 8 or 4. FIGS. 3A and 3B show an example where Pr=8.

Figure 4:
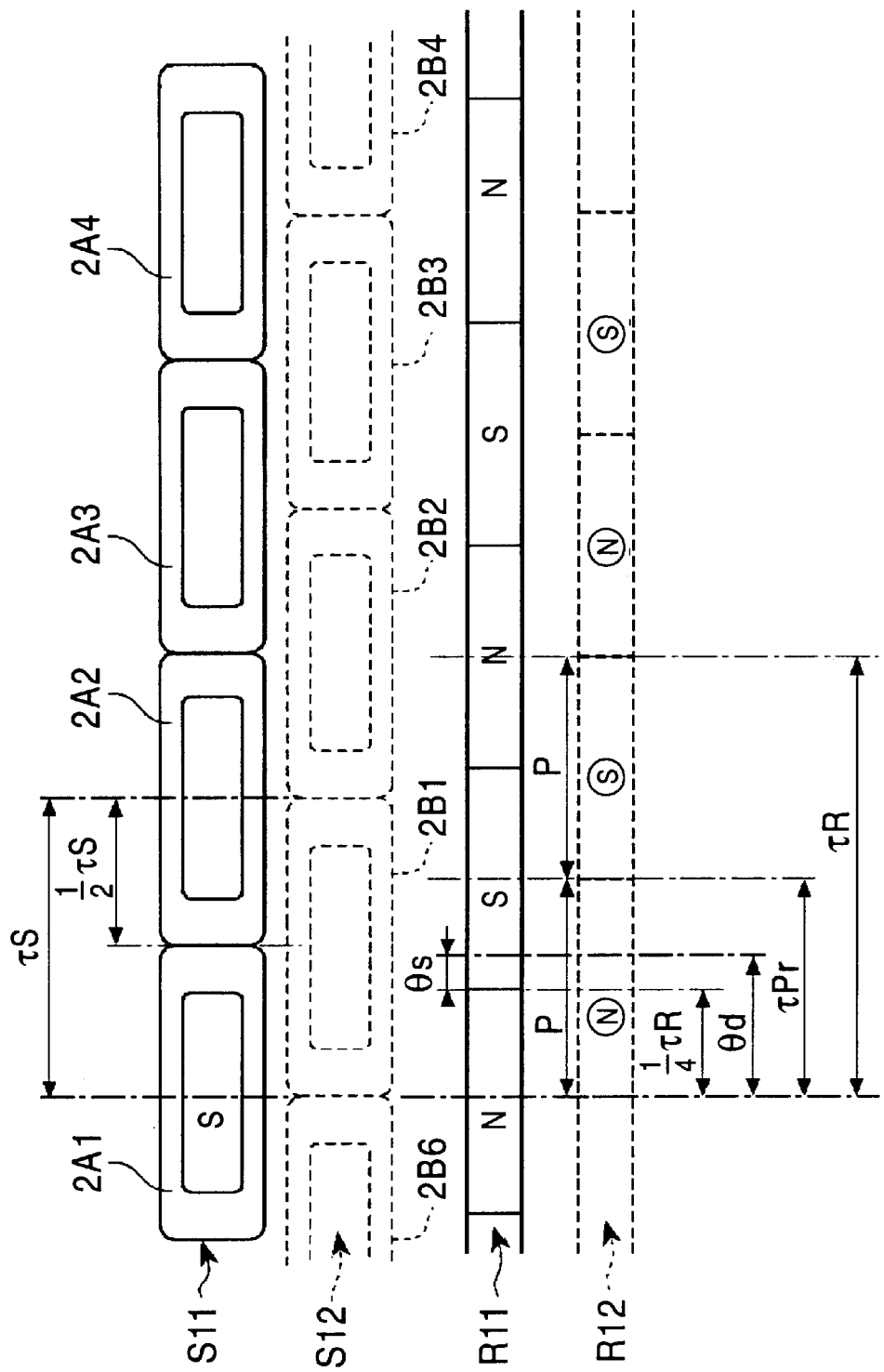
FIG. 4 is a developed view showing a relationship among the stator units and the rotor units included in the motor of the first embodiment.

Next, grounds of the above equation (1) will be described with reference to FIG. 4 that is a developed view of the motor. In FIG. 4, the stator units and the rotor units are modified to facilitate the understanding of the positional relationship therebetween.

In FIG. 4, S11 denotes the first stator unit, S12 denotes the second stator unit, R11 denotes the first rotor unit, R12 denotes the second rotor unit, 2A1–2A4 denote the air-core coils arranged on the first stator unit S11, 2B1–2B4 and 2B6 denote the air-core coils arranged on the second rotor unit S12.

The air-core coils 2B1–2B4 and 2B6 arranged on the second stator unit S12 are formed to be deviated from the air-core coils 2A1–2A4 and 2A6 (not shown) arranged on the first stator unit S11 by (½)τS. The reference τS is the coil arrangement angular pitch between the adjacent air-core coils.

Further, the magnetic poles arranged on the first rotor unit R11 and the second rotor unit R12 having the same polarity are deviated from each other by (¼)τR. The reference τR is the same polarity pole angular pitch between the closest pair of the magnetic poles having the same polarity.

As shown in FIG. 4, the angular distance θd between the center of the coil 2A1 of the first stator unit S11 and the center of the coil 2B1 of the second stator unit S12 (the angles viewed from the center of the respective stator units) is represented by the following equation (2):

$$\theta d=(\tfrac{1}{4})\tau R\pm\theta S \quad (2)$$

The reference θS is equivalent to a rotation angle by one step excitation and it is referred to as a displacement angle in the following description.

Incidentally, assuming that the angular pitch between the adjacent permanent magnets having different polarities is τPr, the same polarity pole angular pitch τR between the closest permanent magnets having the same polarity is represented by the equation (3):

$$\tau R=2\tau Pr \quad (3)$$

Further, since the total number of the permanent magnets of each rotor unit (the magnetic pole number) is represented as Pr, the angular pitch τPr is expressed as the following equation (4):

$$\tau Pr=2\pi/Pr \quad (4)$$

When the phase number m of the motor is equal to or larger than 6, the rotor of the motor of the first embodiment moves (rotates) by τR through 2m steps. Therefore, it is necessary that the displacement angle θS satisfies the following equation (5):

$$\theta S=(\tfrac{1}{2m})\tau R \quad (5)$$

Since the angular distance θd between the center of the coil 2A1 of the first stator unit S11 and the center of the coil 2B1 of the second stator unit S12 is represented by θd=2π/2m, the equation (2) is converted into the equation (6):

$$2\pi/2m=(\tfrac{1}{4})\tau R\pm(\tfrac{1}{2m})\tau R \quad (6)$$

The relationship between the angular pitch of the magnetic poles of the rotor unit having the same polarity and the total number Pr of the N-poles and S-poles can be represented by the following equation (7) based on the equations (3) and (4). Substituting the equation (7) into the equation (6) yields the equation (1) after organization.

$$\tau R=2\tau Pr=4\pi/Pr \quad (7)$$

$$Pr=m\pm 2 \quad (1)$$

Further, since the phase number m equals 6 in the first embodiment, the equation (5) can be converted into the following equation (8):

$$\theta S=(\tfrac{1}{12})\tau R \quad (8)$$

The angular distance θd between the corresponding coils of the respective rotor units in the 6-phase motor according to the first embodiment becomes 360°/12=30° because θd=(½)τS as shown in FIG. 4.

Accordingly, when the air-core coil 2A1 of the first stator unit S11 faces the N-pole of the first rotor unit R11 for example, the deviation angle θS between the air-core coil 2B1 of the second stator unit S12 and the N-pole is equal to (1/12)τR. In the first embodiment, since the magnetic pole number Pr of the permanent magnet equals 8, θS=π/24=7.5°.

Further, the deviation angle between any air-core coil and the adjacent air-core coil that are arranged on the first stator unit S11, for example the deviation angle between the coil 2A1 and the coil 2A2, becomes 2θd=(½)τR±2θS based on the equation (2). In the same manner, the deviation angle between the coil 2A1 and the coil 2B2 becomes 3θd=(¾)τR±2θS.

Therefore, the deviation angle between the coil of the stator unit and the angular pitch of the magnetic pole of the rotor unit increases by multiple of θS.

Next, the connection of the coils of the above-described 6-phase motor will be described with reference to FIG. 5.

In the drawing, the air-core coils 2A1–2A6 arranged on the first stator unit S11 are shown as hexagons illustrated by solid lines, while the air-core coils 2B1–2B6 arranged on the second stator unit S12 are shown as hexagons illustrated by dotted lines.

For the coils of the first stator unit S11, A and A' are terminals of a circuit in which the coils 2A1 and 2A4 are serially connected, B and B' are terminals of a circuit in which the coils 2A2 and 2A5 are serially connected, C and C' are terminals of a circuit in which the coils 2A3 and 2A6 are serially connected. For the coils of the second stator unit S12, D and D' are terminals of a circuit in which the coils 2B1 and 2B4 are serially connected, E and E' are terminals of a circuit in which the coils 2B2 and 2B5 are serially connected, F and F' are terminals of a circuit in which the coils 2B3 and 2B6 are serially connected. In any circuits, the coils are connected in the same winding direction. The coil groups each of which consists of serially connected two coils are connected to a driving circuit.

Figure 6:
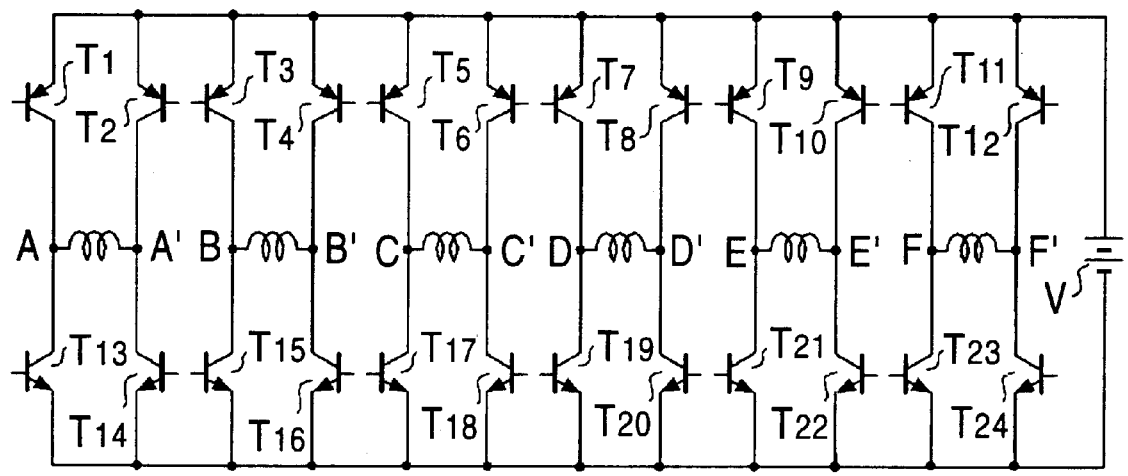
FIG. 6 shows the driving circuit for driving the motor of the first embodiment with single-phase excitation.

FIG. 6 shows a driving circuit for driving the motor of the first embodiment with single-phase excitation. In FIG. 6, T1 through T24 are switching elements such as switching transistors to excite the respective coils, and V represents a power supply. A control circuit for each switching element is not shown in the drawing.

Each terminal of the coil groups is connected to a connection point of switching elements that are serially connected. For instance, the one terminal A of the circuit in which the coils 2A1 and 2A4 are serially connected is connected to the connection point of the switching elements T1 and T13 that are serially connected, and the other terminal A' is connected to the connection point of the switching elements T2 and T14 that are serially connected. Further, the one terminal B of the circuit in which the coils 2A2 and 2A5 are serially connected is connected to the connection point of the switching elements T3 and T15 that are serially connected, and the other terminal B' is connected to the connection point of the switching elements T4 and T16 that are serially connected. While the rest is omitted, four switching elements form bridge connection for each phase and each of the coil groups is connected to the intermediate points of the serial connections in the same manner.

An excitation sequence of single-phase excitation when the 6-phase motor of the first embodiment is driven by the driving circuit of FIG. 6 will be described with reference to FIG. 7.

Figure 7:
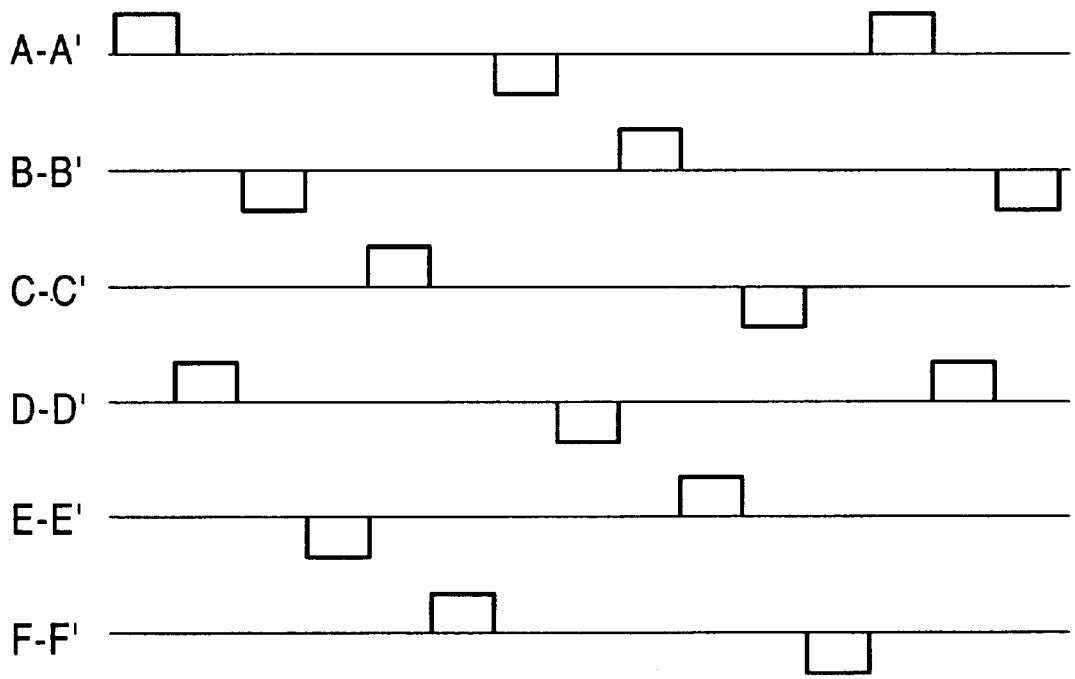
FIG. 7 shows an excitation sequence of single-phase excitation when the motor of the first embodiment is driven by the driving circuit of FIG. 6.

In FIG. 7, a horizontal axis represents a flow of the excitation steps (a sequence) from step 1 to step 15, and the above described terminals A, A' through F, F' are shown in the vertical direction. On the respective horizontal axes, timings to apply a pulse electric current corresponding to the respective steps are shown as quadrilaterals.

A quadrilateral above a horizontal line showing each of the terminals (A–A' through F–F') shows that an electric current passes from the terminal A to the terminal A' (a normal direction) and a quadrilateral below a horizontal line shows that an electric current passes from the terminal A' to the terminal A (a reverse direction), for example.

In step 1, an electric current is supplied from the terminal A to the terminal A' (the normal direction). That is, the switching elements T1 and T14 are brought into conduction to excite the coils 2A1 and 2A4 of the first stator unit S11 in the predetermined polarity by the passage of electric current through the coils in the normal direction.

In step 2, an electric current is supplied from the terminal D to the terminal D' (the normal direction). That is, the switching elements T7 and T20 are brought into conduction to excite the coils 2B1 and 2B4 of the second stator unit S12 in the predetermined polarity by the passage of electric current through the coils in the normal direction.

In step 3, an electric current is supplied from the terminal B' to the terminal B (the reverse direction). That is, the switching elements T4 and T15 are brought into conduction to excite the coils 2A2 and 2A5 of the first stator unit S11 in the opposite polarity by the passage of electric current through the coils in the reverse direction.

The respective switching elements are switched as shown in FIG. 7 to rotate the motor. Steps 1 through 12 are one excitation cycle and steps after step 12 are repetition from step 1.

Figure 8:
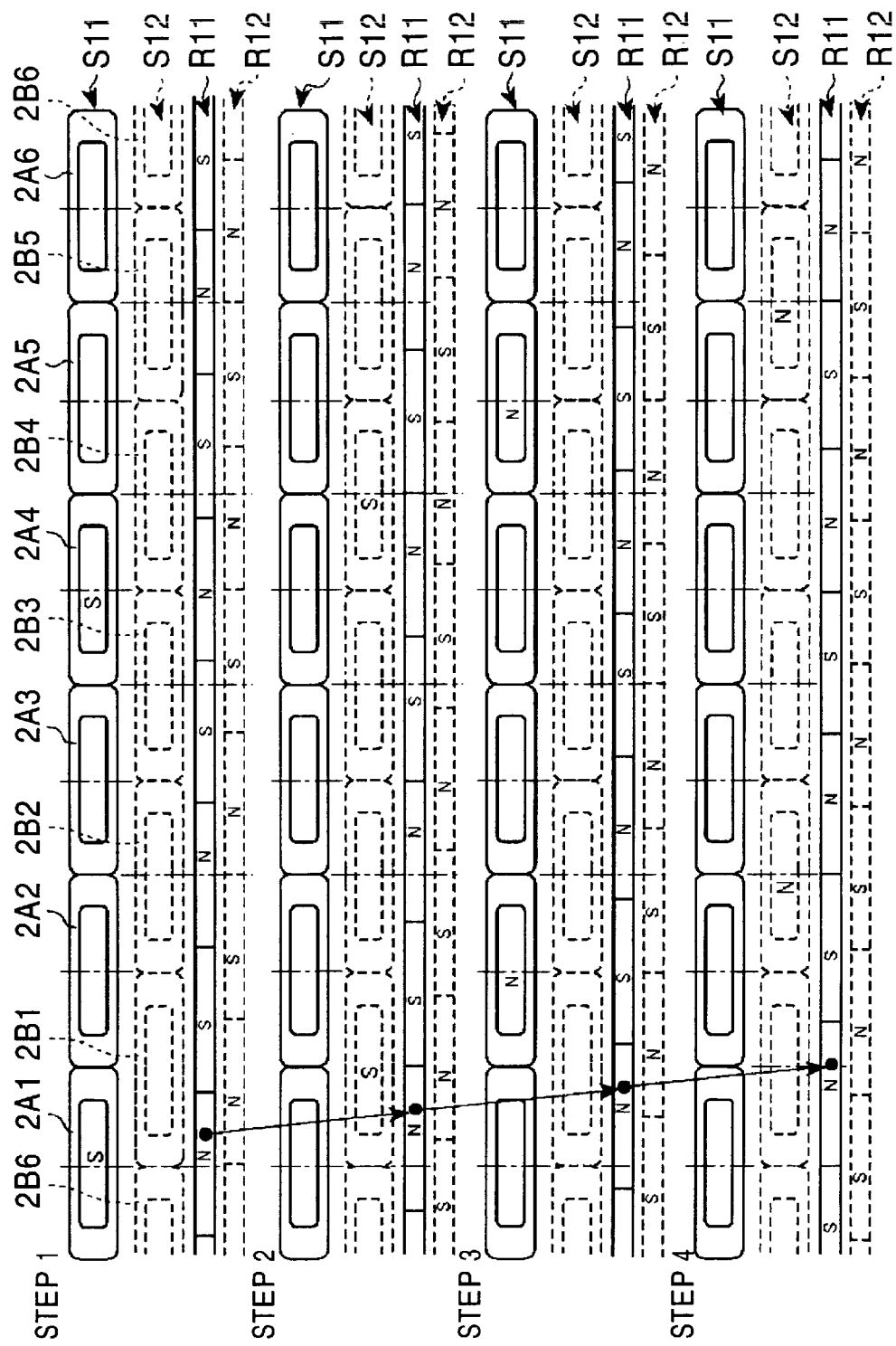
FIG. 8 is a developed view showing the secular change of the relationship between the coils of the stator and the magnetic poles of the rotor when the motor of the first embodiment is driven according to the excitation sequence of FIG. 7.

Next, the rotation of the motor according to the above-described excitation sequence will be described in detail with reference to FIG. 8. FIG. 8 is a developed view showing the secular change of the relationship between the coils of the stator and the magnetic poles of the rotor when the motor of the first embodiment is driven according to the excitation sequence of FIG. 7.

At the uppermost potion in FIG. 8, the positional relationship between the air-core coils of the stator units and the magnetic poles of the rotor units in step 1 shown in FIG. 7 is shown. The second, third, fourth portion of FIG. 8 show the positional relationships in steps 2, 3 and 4 of FIG. 7. Black dots marked on the same N-pole of the first rotor unit R11 and allows linking the black dots show the movement (rotation) of the rotor units according to the excitation steps.

In step 1, the coils 2A1 and 2A4 of the first stator unit S11 are excited in S-pole by the passage of electric current through the coils in the normal direction. And thus, the N-poles of the first rotor unit R11 are attracted by the coils 2A1 and 2A4 and are moved to the opposite positions, respectively.

In step 2, the coils 2B1 and 2B4 of the second stator unit S12 are excited in S-pole by the passage of electric current through the coils in the normal direction. And thus, the N-poles of the second rotor unit R12 are attracted by the coils 2B1 and 2B4 and are moved to the opposite positions, respectively. Accordingly, the rotor units move (rotate) by θS from the position at step 1.

In step 3, the coils 2A2 and 2A5 of the first stator unit S11 are excited in N-pole by the passage of electric current through the coils in the reverse direction. And thus, the S-poles of the first rotor unit R11 are attracted by the coils 2A2 and 2A5 and are moved to the opposite positions, respectively. Accordingly, the rotor units move (rotate) by θS from the position at step 2.

In step 4, the coils 2B2 and 2B5 of the second stator unit S12 are excited in N-pole by the passage of electric current through the coils in the reverse direction. And thus, the S-poles of the second rotor unit R12 are attracted by the coils 2B2 and 2B5 and are moved to the opposite positions, respectively. Accordingly, the rotor units move (rotate) by θS from the position at step 3.

The motor rotates by the step angle θS (=π/24 in this embodiment) at every step. The motor continues to rotate by repeating the steps shown in FIG. 7.

Next, two driving circuits for driving the 6-phase motor of the first embodiment with multi-phase excitation will be described with reference to FIGS. 9 and 10.

Figure 5:
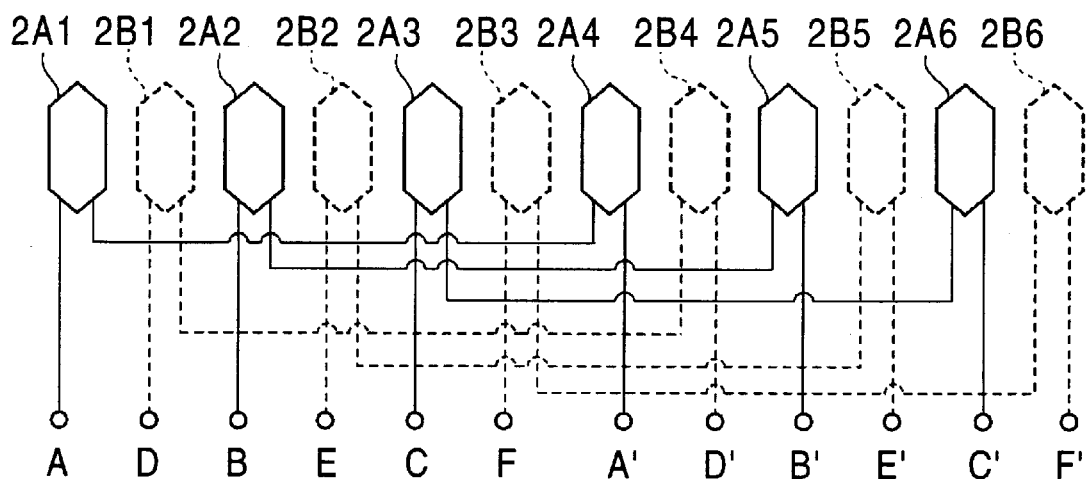
FIG. 5 is a connection diagram of the coils in the motor of the first embodiment.
Figure 9:
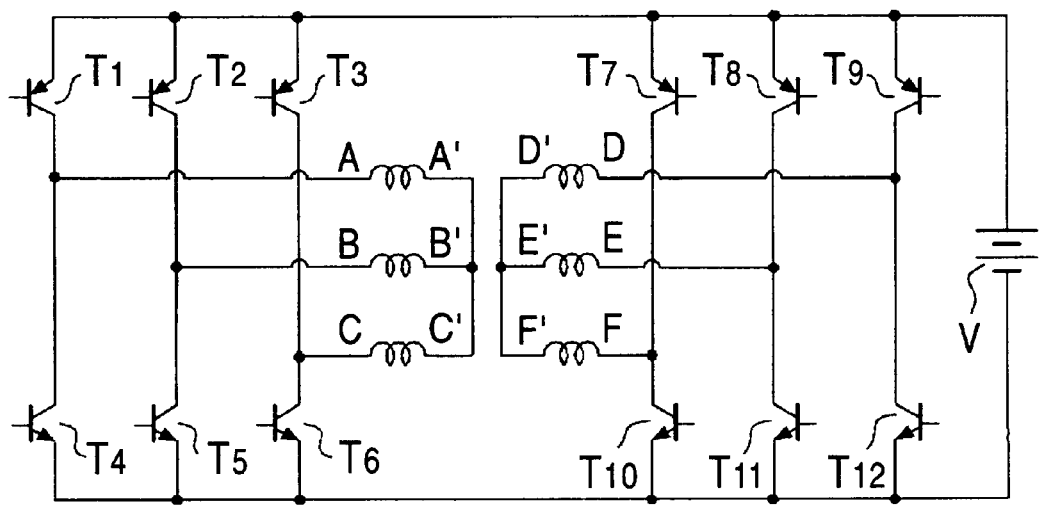
FIG. 9 shows a first example of driving circuit for driving the motor of the first embodiment with multi-phase excitation.

In FIG. 9, terminals A, A', B, B', C, C', D, D', E, E', F and F' are the same symbols shown in the connection diagram in FIG. 5.

For the first stator unit S11, the one terminal A of the circuit in which the coils 2A1 and 2A4 are serially connected is connected to the connection point of the switching elements T1 and T4 that are serially connected, the one terminal B of the circuit in which the coils 2A2 and 2A5 are serially connected is connected to the connection point of the switching elements T2 and T5 that are serially connected, and the one terminal C of the circuit in which the coils 2A3 and 2A6 are serially connected is connected to the connection point of the switching elements T3 and T6 that are serially connected. The other terminals A', B' and C' are connected to each other at the opposite side. That is, three coil groups of the first stator unit S11 are connected as a star connection.

For the second stator unit S12, the one terminal D of the circuit in which the coils 2B1 and 2B4 are serially connected is connected to the connection point of the switching elements T9 and T12 that are serially connected, the one terminal E of the circuit in which the coils 2B2 and 2B5 are serially connected is connected to the connection point of the switching elements T8 and T11 that are serially connected, and the one terminal F of the circuit in which the coils 2B3 and 2B6 are serially connected is connected to the connection point of the switching elements T7 and T10 that are serially connected. The other terminals D', E' and F' are connected to each other at the opposite side. That is, three coil groups of the second stator unit S12 are connected as a star connection.

In FIG. 9, a reference V denotes a power supply and a control circuit for each switching element is not shown.

Figure 10:
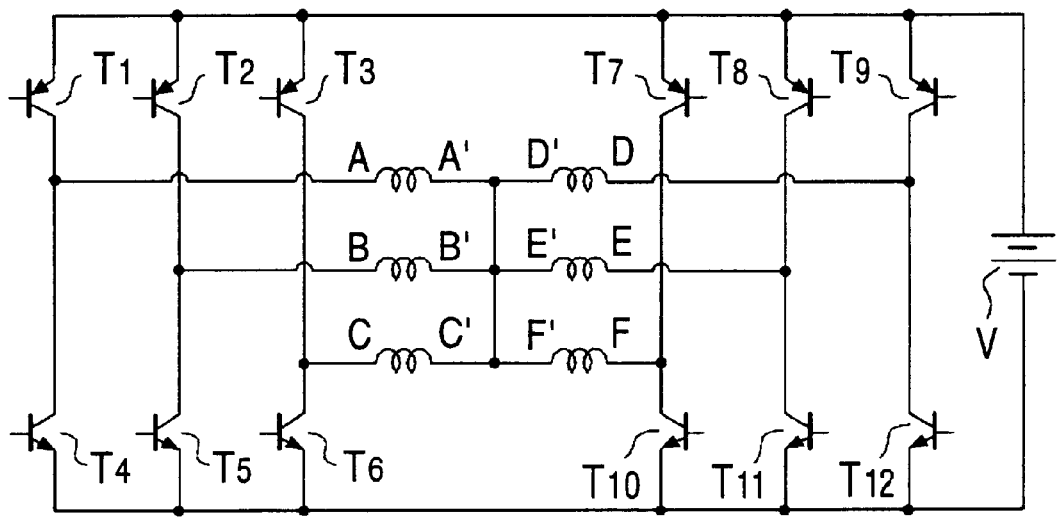
FIG. 10 shows a second example of driving circuit for driving the motor of the first embodiment with multi-phase excitation.

The driving circuit shown in FIG. 10 is similar to that in FIG. 9, however, the connection point of the coil groups arranged on the first stator unit S11 is connected to the connection point of the coil groups arranged on the second stator unit S12. That is, six coil groups of the first and second stator units S11 and S12 are connected as a star connection.

In FIG. 10, a reference V denotes a power supply and a control circuit for each switching element is not shown.

An excitation sequence of 4-phase excitation when the 6-phase motor of the first embodiment is driven by the driving circuit of FIG. 9 or FIG. 10 will be described with reference to FIG. 11.

Figure 11:
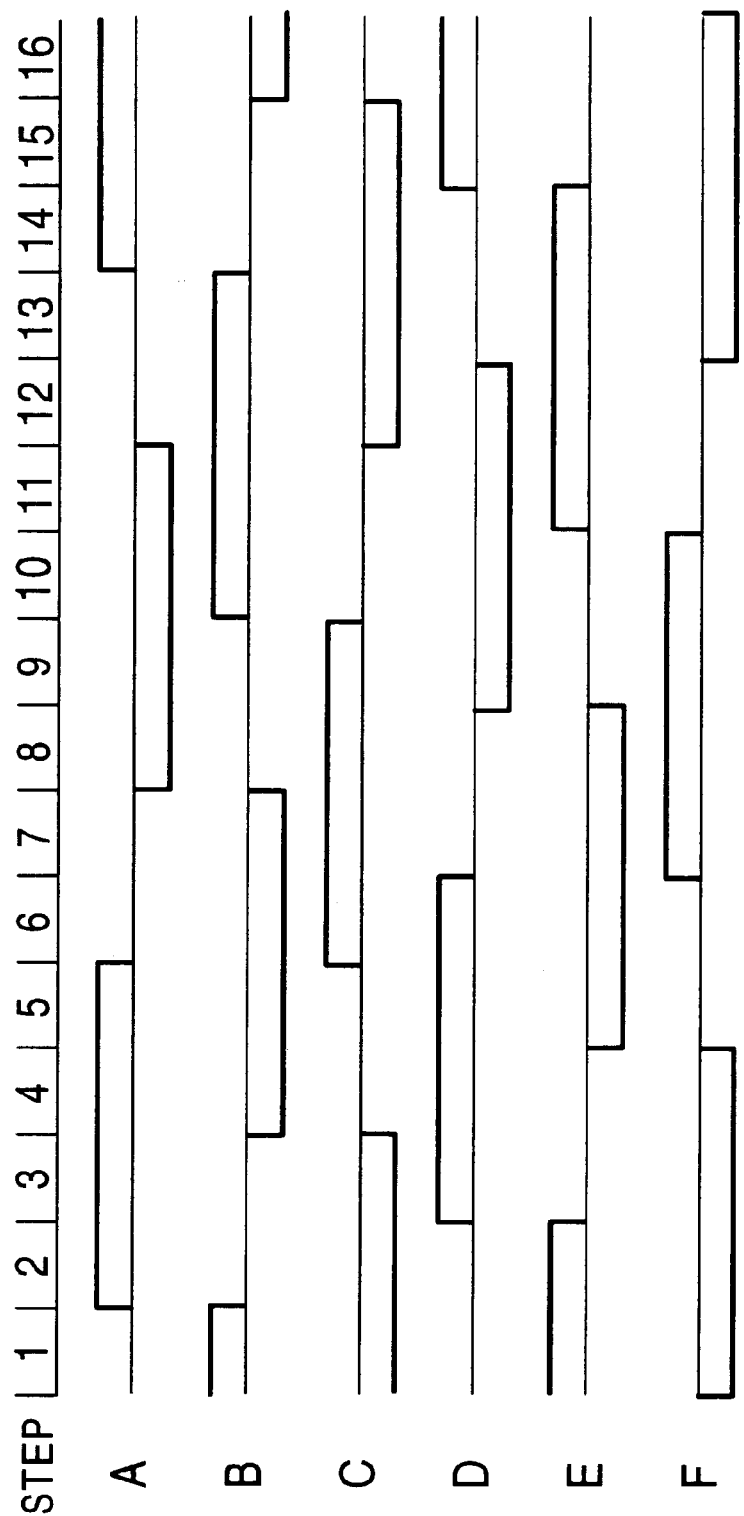
FIG. 11 shows an excitation sequence of 4-phase excitation when the motor of the first embodiment is driven by the driving circuit of FIG. 9 or FIG. 10.

In FIG. 11, a horizontal axis represents a flow of the excitation steps (a sequence) from step 1 to step 16, and the above described terminals A, A' through F, F' are shown in the vertical direction. A quadrilateral above a horizontal line showing each of the terminals (A–A' through F–F') shows that an electric current passes from the terminal A to the terminal A' (a normal direction) and a quadrilateral below a horizontal line shows that an electric current passes from the terminal A' to the terminal A (a reverse direction), for example.

In step 1, the switching elements T2 and T6 are conducting, which forms a circuit that includes the switching element T2, the coils 2A2 and 2A5 between the terminals B and B', the coils 2A3 and 2A6 between the terminals C and C', and the switching element T6. An electric current passes through the coils 2A2 and 2A5 from the terminal B to the terminal B' in the normal direction, and passes through the coils 2A3 and 2A6 from the terminal C' to the terminal C in the reverse direction.

Further, in step 1, the switching elements T8 and T10 are conducting, which forms a circuit that includes the switching element T8, the coils 2B2 and 2B5 between the terminals E and E', the coils 2B3 and 2B6 between the terminals F and F', and the switching element T10. An electric current passes through the coils 2B2 and 2B5 from the terminal D to the terminal D' in the normal direction, and passes through the coils 2B3 and 2B6 from the terminal F' to the terminal F in the reverse direction.

In step 2, the switching elements T1 and T6 are brought into conduction to pass an electric current from the terminal A to the terminal A' in the normal direction and to pass the electric current from the terminal C' to the terminal C in the reverse direction. Further, the switching elements T8 and T10 are brought into conduction to pass an electric current from the terminal E to the terminal E' in the normal direction and to pass the electric current from the terminal F' to the terminal F in the reverse direction.

In step 3, the switching elements T1 and T6 are brought into conduction to pass an electric current from the terminal A to the terminal A' in the normal direction and to pass the electric current from the terminal C' to the terminal C in the reverse direction. Further, the switching elements T9 and T10 are brought into conduction to pass an electric current from the terminal D to the terminal D' in the normal direction and to pass the electric current from the terminal F' to the terminal F in the reverse direction.

The respective switching elements are switched as shown in FIG. 11 to rotate the motor. Steps 1 through 12 are one excitation cycle and steps after step 12 are repetition from step 1.

Second Embodiment

A motor of the second embodiment will be described next. The motor of the second embodiment is a 10-phase motor that is constructed as a combination of first and second 5-phase motor units having ten coils, respectively.

The basic construction of the 10-phase motor of the second embodiment is the same as the 6-phase motor of the first embodiment. A number of the air-core coil is increased.

The magnetic pole number Pr that is a total number of N-poles and S-poles of the 10-phase motor is obtained by substituting m=10 into the equation (1). Accordingly, Pr equals 12 or 8.

The coil arrangement angular pitch τS between the adjacent air-core coils in each stator unit, the angular distance θd between the center of the coil of a first stator unit S21 (not shown) and the center of the coil of a second stator unit S22 (not shown), the same polarity pole angular pitch τR and the deviation angle θS will be described with reference to the equations (2) through (7).

Since the coil number of each stator unit is equal to 10, τS=2π/10 as is evident from FIG. 4. Assuming that the total number Pr of the N-poles and S-poles of each rotor unit equals 12, τR=2π/6=π/3, and the deviation angle θS is equal to (½m)τR as described in the equation (5). Accordingly, θS=(1/20)τR=π/60 for the 10-phase motor of the second embodiment.

Next, the connection of the coils of the above-described 10-phase motor will be described with reference to FIG. 12.

In the drawing, the air-core coils 2C1–2C10 arranged on the first stator unit S21 are shown as hexagons illustrated by solid lines, while the air-core coils 2D1–2D10 arranged on the second stator unit S22 are shown as hexagons illustrated by dotted lines.

For the coils of the first stator unit S21, A and A' are terminals of a circuit in which the coils 2C1 and 2C6 are serially connected, B and B' are terminals of a circuit in which the coils 2C2 and 2C7 are serially connected, C and C' are terminals of a circuit in which the coils 2C3 and 2C8 are serially connected. In the same manner, terminals D and D', E and E' are connected to the respective coils connected serially.

For the coils of the second stator unit S22, F and F' are terminals of a circuit in which the coils 2D1 and 2D6 are serially connected, G and G' are terminals of a circuit in which the coils 2D2 and 2D7 are serially connected, H and H' are terminals of a circuit in which the coils 2D3 and 2D8 are serially connected. In the same manner, terminals I and I', J and J' are connected to the respective coils connected serially. In any circuits, the coils are connected in the same winding direction.

Next, an excitation sequence of single-phase excitation for the 10-phase motor of the second embodiment will be described with reference to FIG. 13.

A driving circuit for the 10-phase motor can be constructed as with the driving circuit of FIG. 6. Four switching elements form bridge connection for each phase and each terminal described in FIG. 12 is connected to the intermediate point of the serial connection.

Figure 13:
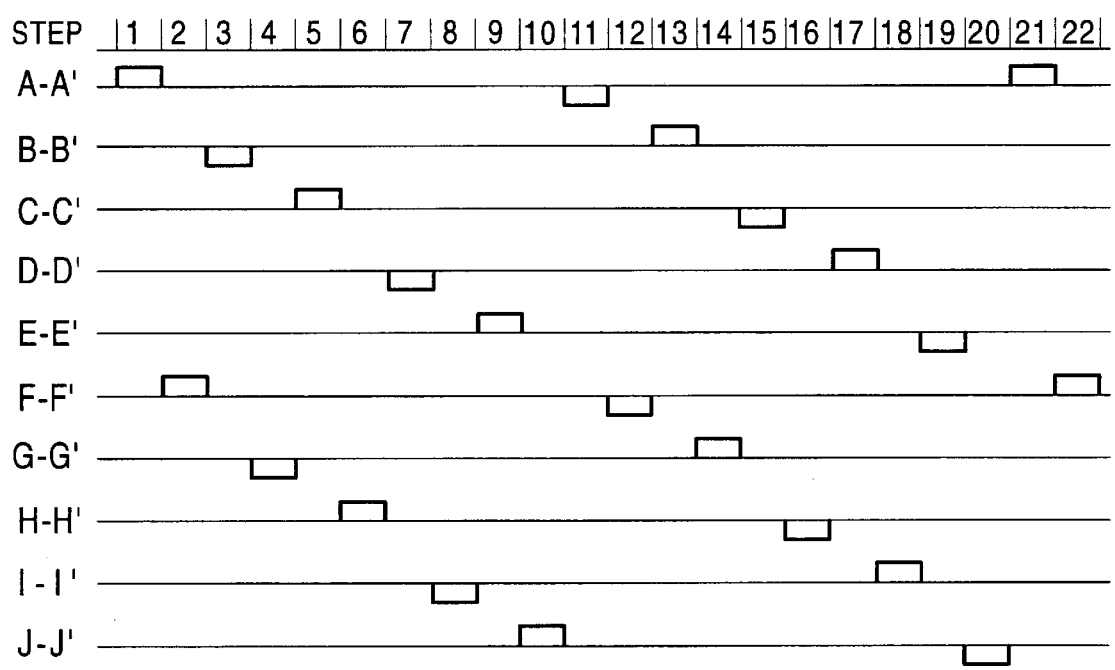
FIG. 13 is an excitation sequence of single-phase excitation when the motor of the second embodiment is driven.

In FIG. 13, a horizontal axis represents a flow of the excitation steps (a sequence) from step 1 to step 22, and the above described terminals A, A' through J, J' are shown in the vertical direction. For supplying an electric current to each of the coil groups, the switching elements corresponding to the direction of electric current and the target coil group to be excited are brought into conduction.

A quadrilateral above a horizontal line showing each of the terminals (A–A' through J–J') shows that an electric current passes from the terminal A to the terminal A' (a normal direction) and a quadrilateral below a horizontal line shows that an electric current passes from the terminal A' to the terminal A (a reverse direction), for example.

In step 1, an electric current is supplied from the terminal A to the terminal A' (the normal direction) to excite the coils 2C1 and 2C6 of the first stator unit S21 in the predetermined polarity.

In step 2, an electric current is supplied from the terminal F to the terminal F' (the normal direction) to excite the coils 2D1 and 2D6 of the second stator unit S22 in the predetermined polarity.

In step 3, an electric current is supplied from the terminal B' to the terminal B (the reverse direction) to excite the coils 2C2 and 2C7 of the first stator unit S21 in the polarity opposite to in steps 1 and 2.

The respective switching elements are switched as shown in FIG. 13 to rotate the motor. Steps 1 through 20 are one excitation cycle and steps after step 20 are repetition from step 1.

Next, two driving circuits for driving the 10-phase motor of the second embodiment with multi-phase excitation will be described with reference to FIGS. 14 and 15.

Figure 12:
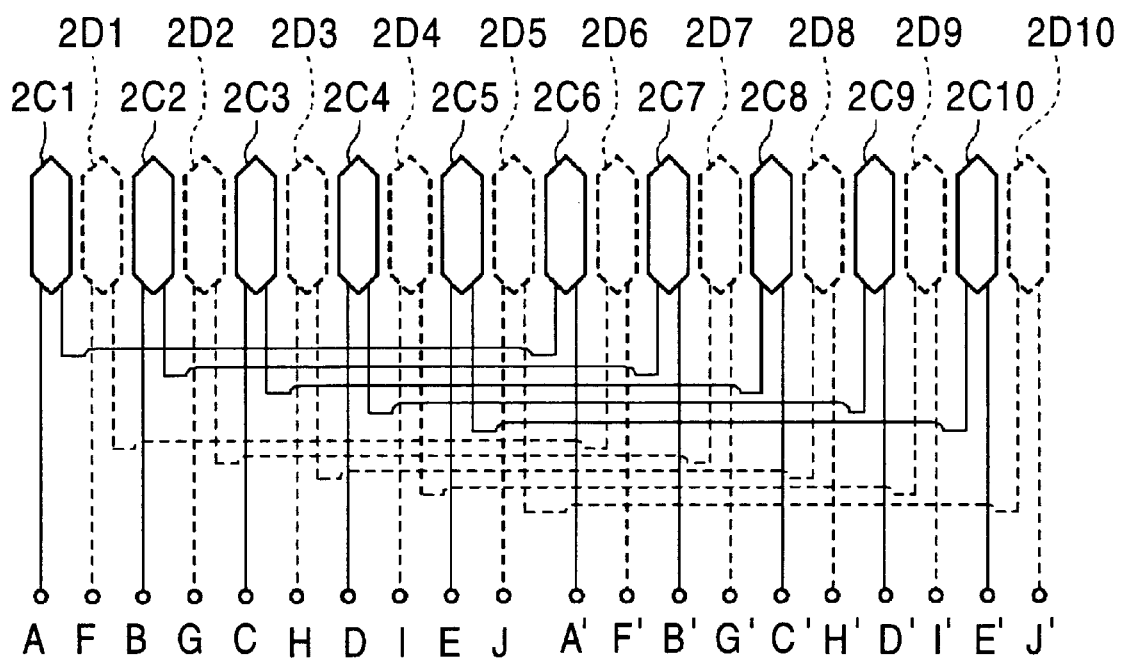
FIG. 12 is a connection diagram of the coils in a 10-phase flat-type PM stepping motor according to a second embodiment.
Figure 14:
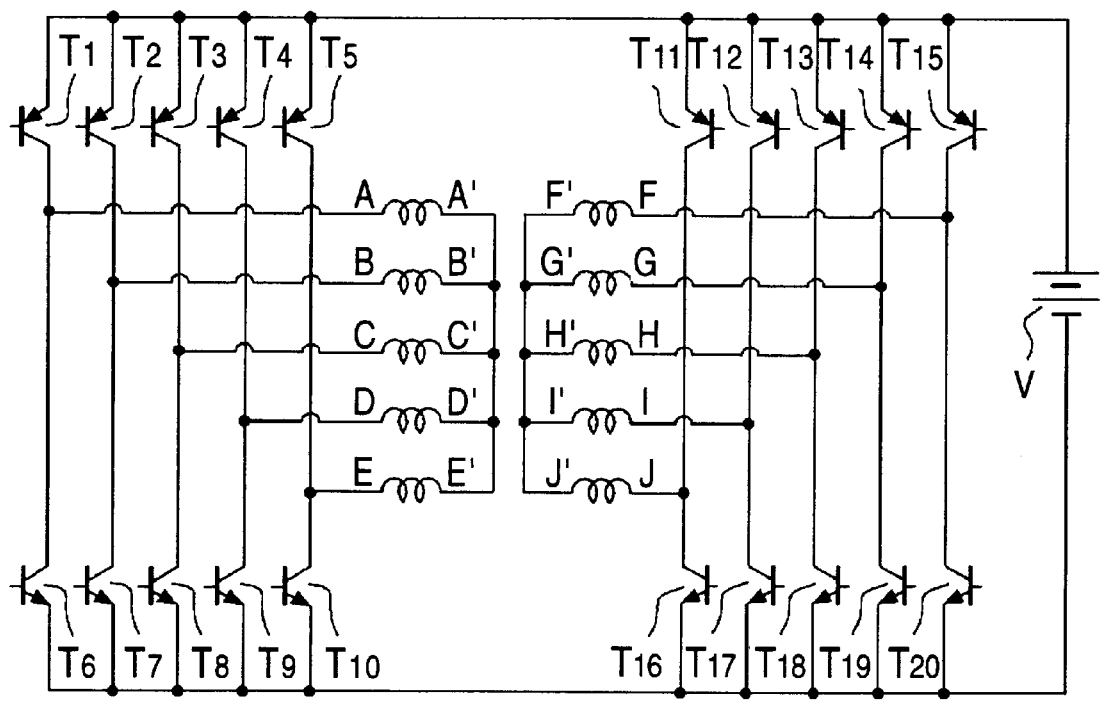
FIG. 14 shows a first example of driving circuit for driving the motor of the second embodiment with multi-phase excitation.

In FIG. 14, terminals A, A', B, B', C, C', D, D', E, E', F, F', G, G', H, H', I, I', J and J' are the same symbols shown in the connection diagram in FIG. 12.

For the first stator unit S21, the one terminal A of the circuit in which the coils 2C1 and 2C6 are serially connected is connected to the connection point of the switching elements T1 and T6 that are serially connected, the one terminal B of the circuit in which the coils 2C2 and 2C7 are serially connected is connected to the connection point of the switching elements T2 and T7 that are serially connected, the one terminal C of the circuit in which the coils 2C3 and 2C8 are serially connected is connected to the connection point of the switching elements T3 and T8 that are serially connected, the one terminal D of the circuit in which the coils 2C4 and 2C9 are serially connected is connected to the connection point of the switching elements T4 and T9 that are serially connected, and the one terminal E of the circuit in which the coils 2C5 and 2C10 are serially connected is connected to the connection point of the switching elements T5 and T10 that are serially connected. The other terminals A', B', C', D' and E' are connected to each other at the opposite side. That is, five coil groups of the first stator unit S21 are connected as a star connection.

For the second stator unit S22, the one terminal F of the circuit in which the coils 2D1 and 2D6 are serially connected is connected to the connection point of the switching elements T11 and T16 that are serially connected, the one terminal G of the circuit in which the coils 2D2 and 2D7 are serially connected is connected to the connection point of the switching elements T12 and T17 that are serially connected, the one terminal H of the circuit in which the coils 2D3 and 2D8 are serially connected is connected to the connection point of the switching elements T13 and T18 that are serially connected, the one terminal I of the circuit in which the coils 2D4 and 2D9 are serially connected is connected to the connection point of the switching elements T14 and T19 that are serially connected, and the one terminal J of the circuit in which the coils 2D5 and 2D10 are serially connected is connected to the connection point of the switching elements T15 and T20 that are serially connected. The other terminals F', G', H', I' and J' are connected to each other at the opposite side. That is, five coil groups of the second stator unit S22 are connected as a star connection.

In FIG. 14, a reference V denotes a power supply and a control circuit for each switching element is not shown.

Figure 15:
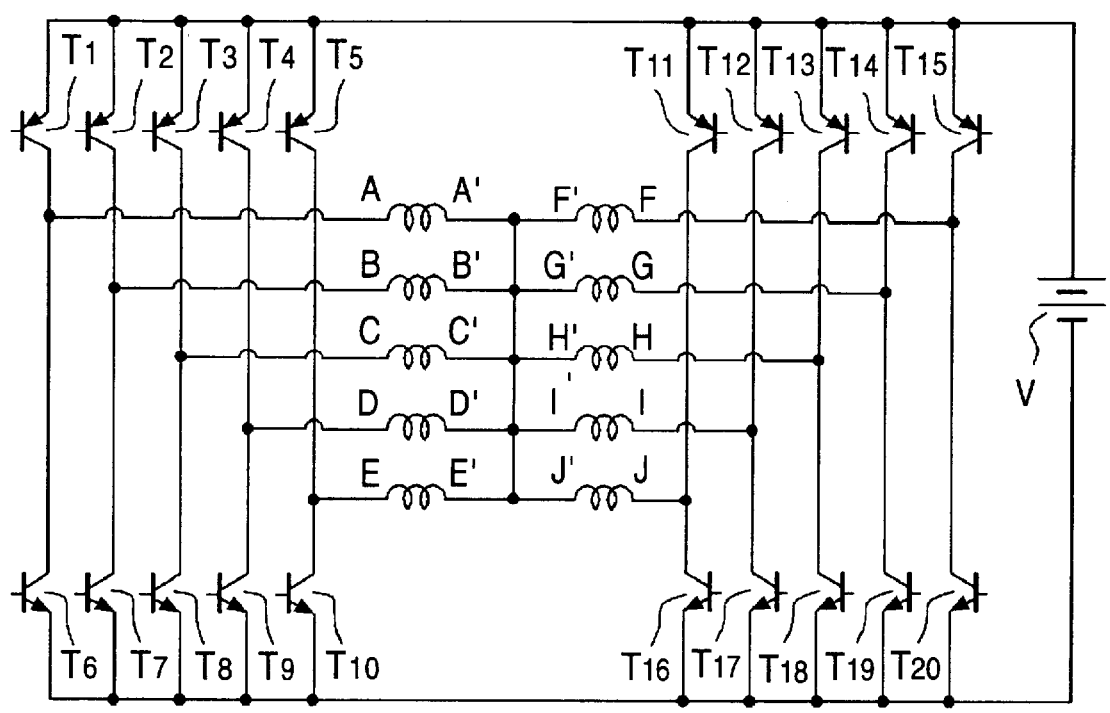
FIG. 15 shows a second example of driving circuit for driving the motor of the second embodiment with multi-phase excitation.

The driving circuit shown in FIG. 15 is similar to that in FIG. 14, however, the connection point of the coil groups arranged on the first stator unit S21 is connected to the connection point of the coil groups arranged on the second stator unit S22. That is, six ten coil groups of the first and second stator units S21 and S22 are connected as a star connection.

In FIG. 15, a reference V denotes a power supply and a control circuit for each switching element is not shown.

An excitation sequence of 8-phase excitation when the 10-phase motor of the second embodiment is driven by the driving circuit of FIG. 14 or FIG. 15 will be described with reference to FIG. 16.

Figure 16:
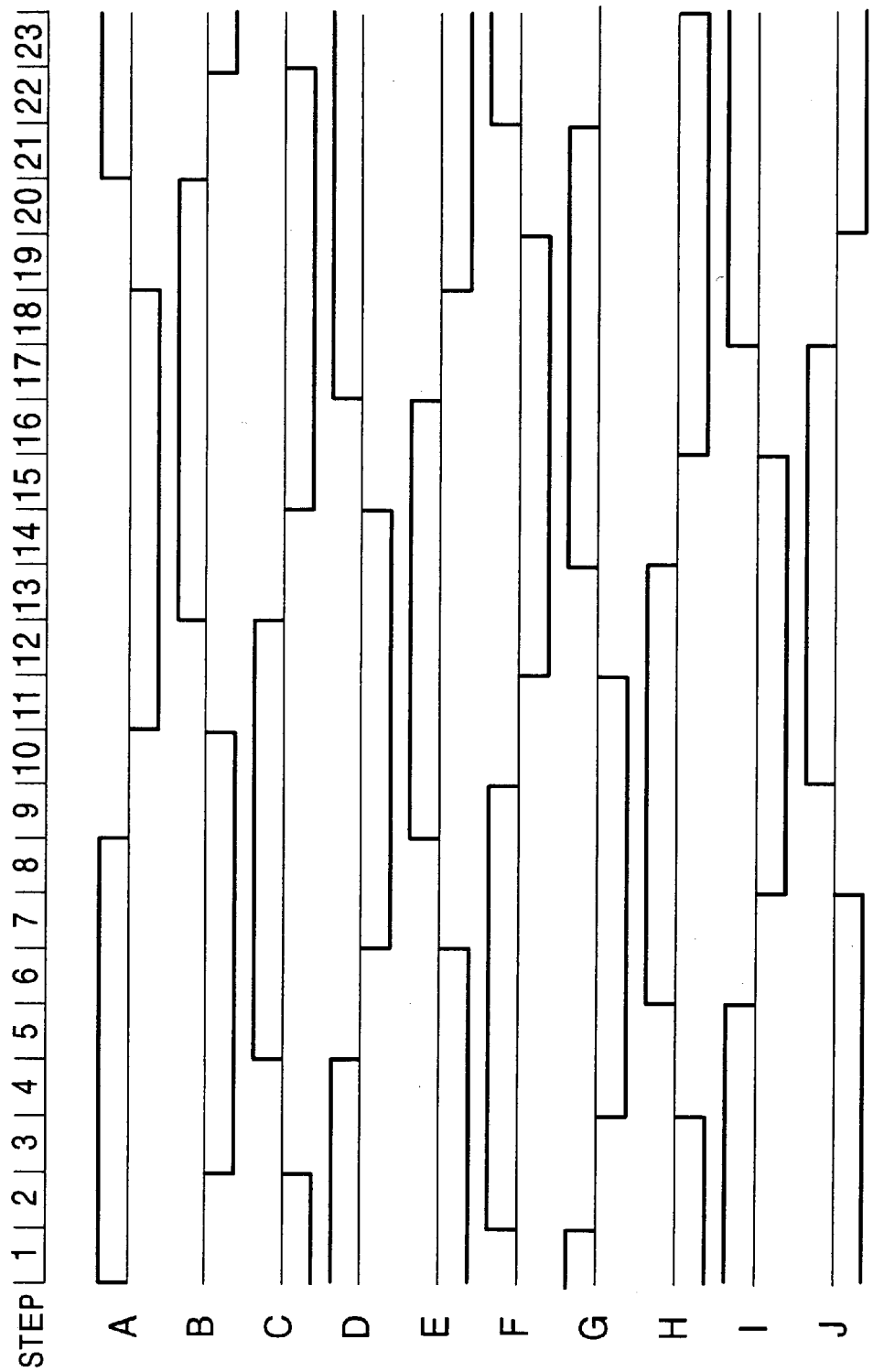
FIG. 16 shows an excitation sequence of 8-phase excitation when the motor of the second embodiment is driven by the driving circuit of FIG. 14 or FIG. 15.

In FIG. 16, a horizontal axis represents a flow of the excitation steps (a sequence) from step 1 to step 23, and the above described terminals A, A' through J, J' are shown in the vertical direction. A quadrilateral above a horizontal line showing each of the terminals (A–A' through J–J') shows that an electric current passes from the terminal A to the terminal A' (a normal direction) and a quadrilateral below a horizontal line shows that an electric current passes from the terminal A' to the terminal A (a reverse direction), for example.

In step 1, the switching elements T1, T4, T8 and T10 are brought into conduction, which feeds an electric current from the terminals A and D in the normal direction and feeds the electric current from the terminals C' and E' in the reverse direction. Further, the switching elements T12, T14, T16 and T18 are brought into conduction, which feeds an electric current from the terminals G and I in the normal direction and feeds the electric current from the terminals H' and J' in the reverse direction. As a result, the eight coil groups are excited in the respective polarities.

In step 2, the switching elements T1, T4, T8 and T10 are continuously conducting, which feeds an electric current from the terminals A and D in the normal direction and feeds the electric current from the terminals C' and E' in the reverse direction. Further, the switching element T14 opens and the switching element T15 is brought into conduction. The switching elements T12, T16 and T18 are continuously conducting. Accordingly, an electric current passes from the terminals F and I in the normal direction and passes from the terminals H' and J' in the reverse direction. As a result, the eight coil groups are excited in the respective polarities.

The respective switching elements are switched as shown in FIG. 16 to rotate the motor. Steps 1 through 20 are one excitation cycle and steps after step 20 are repetition from step 1.

The motors and the driving circuits described in the first and second embodiments are examples of the present invention and any variations are available corresponding to use and condition.

For example, while the embodiments only touches the practical 6-phase and 10-phase motors, the present invention can be applied to a motor of an integral multiple of 6-phase and a motor of an integral multiple of 10-phase. This is a reason why claim 3 does not limit the phase number and the magnetic pole number.

When the present invention is applied to the motor of an integral multiple of 6-phase or 10-phase, the magnetic pole number is determined based on the equation (1) Pr=m±2. A number of coils of a stator unit is determined corresponding to the magnetic pole number Pr. Further, since the angular pitch τR is found by the equations (3) and (4) based on the magnetic pole number Pr, the displacement angle θS can be determined by the equation (5). The displacement angle θS is equivalent to a rotation angle by one step excitation as described above. In another definition, the displacement angle θS is an angle between the predetermined coil of the second stator unit and the opposite magnetic pole of the second rotor unit when the coil of the first stator unit, which is deviated from the predetermined coil of the second rotor unit by ½ of the coil arrangement angular pitch, is coincident with the opposite magnetic pole of the first rotor unit.

Since the multi-phase flat-type PM stepping motor and the driving circuit thereof according to the first and second embodiments are constituted as above, they have the following superior effects.

(1) Since the magnetic coupling between the stator unit and the rotor unit is in the axial direction, the thickness of the motor in the axial direction can be largely reduced as compared with a hybrid stepping motor that is formed by stacking iron cores.
(2) The air-core coils arranged in the stator unit does not cause the cogging torque, which reduces vibration during rotation.
(3) Further, the motor is free from the cogging torque, which reduces wave-form distortion of torque with respect to rotation angle, increasing controllability.
(4) Since both of the stator unit and rotor unit are constructed without use of iron-cores, magnetic noise during high-speed rotation can be reduced.
(5) While the coil of the stator is an air-core coil, a small step angle is provided. That is, the minimum step angle of the conventional 6-phase stepping motor was 15°, while the step angle of the motor of the invention can be smaller than 3.75°.
(6) Since the driving circuit of the multi-phase flat-type PM stepping motor of the invention can connect the coil groups of the respective motor units as a star connection or can connect all of the coil groups of the first and second motor units to enable a multi-phase excitation, a number of the switching elements can be decreased, which simplifies the driving circuit and reduces the cost.
(7) Accordingly, the multi-phase excitation of the invention can cut a number of switching elements forming a driving circuit in half as compared with a prior art. For instance, a 6-phase motor requires 12 switching elements and a 10-phase motor requires 20 switching elements, which sharply reduces the cost.
(8) The invention enables a low cost multi-phase excitation, which increases output torque with reducing vibration.
(9) The driving circuit designed as above can be used as a driving circuit of a brushless motor, which reduces the cost from the viewpoint of productivity.

Third Embodiment

Figure 17:
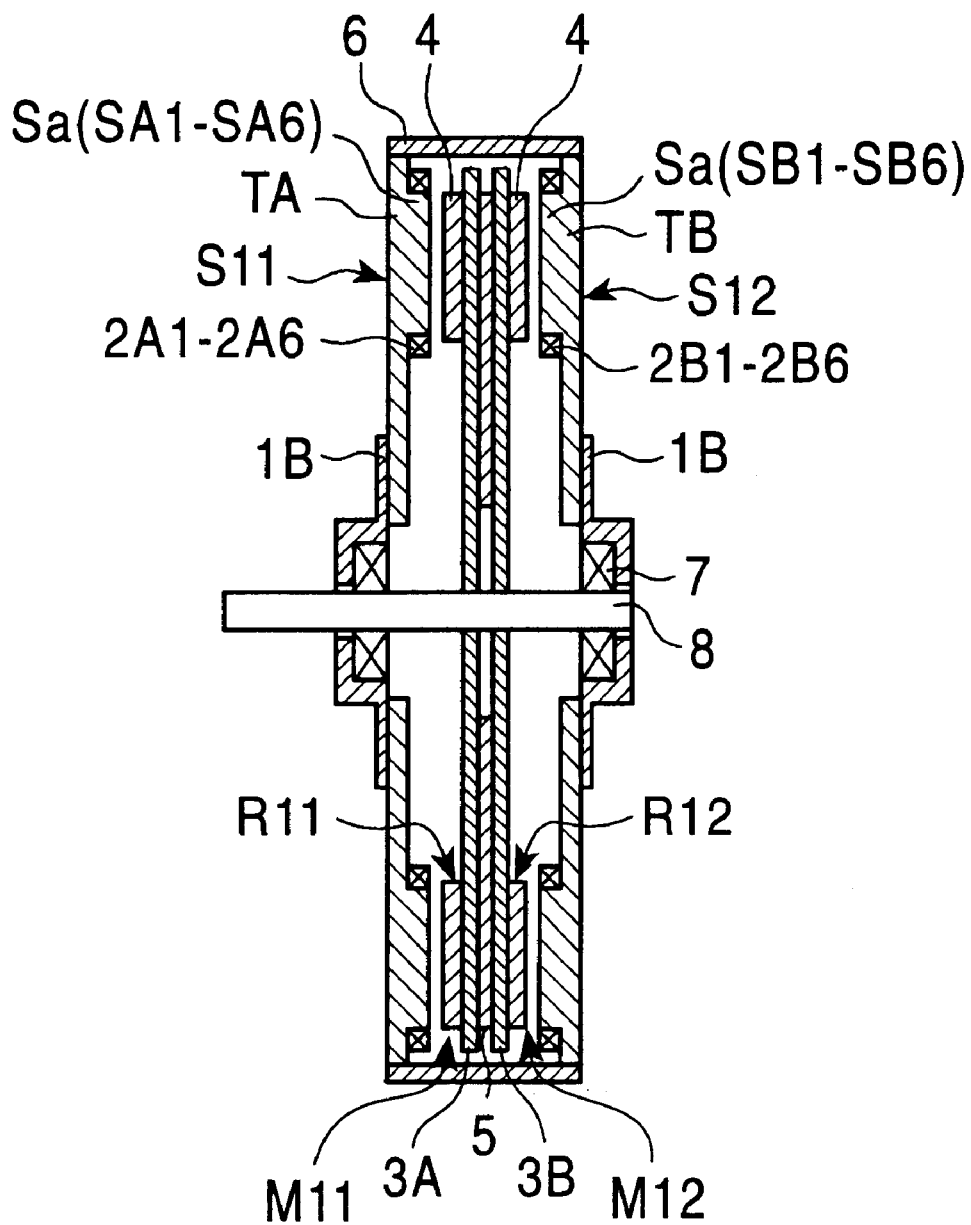
FIG. 17 is a vertical sectional side view showing a schematic construction of a 6-phase flat-type PM stepping motor according to a third embodiment.

FIG. 17 is a vertical sectional side view showing schematic constitution of a multi-phase flat-type PM stepping motor according to a third embodiment. The multi-phase flat-type PM stepping motor of the third embodiment is a 6-phase motor that is constructed as a combination of first and second 3-phase motor units M11 and M12 having six coils, respectively.

The first motor unit M11 consists of a first stator unit S11 providing a plurality of magnetic poles SA1–SA6 that are radially arranged on a first isolating magnetic disc TA, and a first rotor unit R11, which is rotatably supported, having a plurality of permanent magnets 4 that are alternatively magnetized in N-pole and S-pole and radially arranged on a second magnetic disc 3A with a predetermined air gap with respect to the magnetic pole surface of the first stator unit S11. The magnetic poles SA1–SA6 have pole teeth Sa on the top thereof and are wound by coils 2A1–2A6, respectively. The pitch of the permanent magnet 4 arranged on the first rotor unit R11 corresponds to the pitch of the pole teeth Sa formed on the magnetic poles of the first stator unit S11.

In the same manner, the second motor unit M12 consists of a second stator unit S12 providing a plurality of magnetic poles SB1–SB6 that are radially arranged on a third isolating magnetic disc TB and are wound by coils 2B1–2B6, and a second rotor unit R12, which is rotatably supported, having a plurality of permanent magnets 4 that are radially arranged on a fourth magnetic disc 3B.

Each of the pole teeth formed on the magnetic pole SA1–SA6, SB1–SB6 of the first and second stator stator unit S11 and S12 is a projection whose sectional shape is rectangular, three pole teeth are radially formed on each of the magnetic poles at the same pitch.

The first and second motor units M11 and M12 are coaxial and symmetric with each other about a non-magnetic disc 5 arranged therebetween. In other words, the first rotor unit R11 and the second rotor unit R12 are fixed coaxially and symmetrically. The non-magnetic disc 5 is sandwitched between the magnetic discs 3A and 3B. The first rotor unit R11 and the second rotor unit R12 face the first and second stator units S11 and S12 with a predetermined air gaps, respectively.

The first rotor unit R11 and the second rotor unit R12 are fixed to a rotation axis 8 in the center areas thereof. The permanent magnets 4 that are alternatively magnetized in N-pole and S-pole are radially arranged on the second and fourth magnetic discs 3A and 3B. Size and pitch of the permanent magnets 4 correspond to that of the pole teeth Sa formed on the magnetic poles SA1–SA6 and SB1–SB6 provided on the stator units S11 and S12. The respective N-poles and S-poles are magnetic poles of the rotor unit.

Circumference edges of the magnetic discs TA and TB of the first stator unit S11 and the second stator unit S12 are fixed by a circumference ring 6. A pair of brackets 1B are fixed to the center of the magnetic discs TA and TB, respectively, and the rotation axis 8 is supported by a pair of bearings 7 supported by the brackets 1B.

The positional relationship between the coils 2A1–2A6 arranged on the first stator unit S11 and the coils 2B1–2B6 arranged on the second stator unit S12 is identical to that of the first embodiment shown in FIG. 2.

Figure 18:
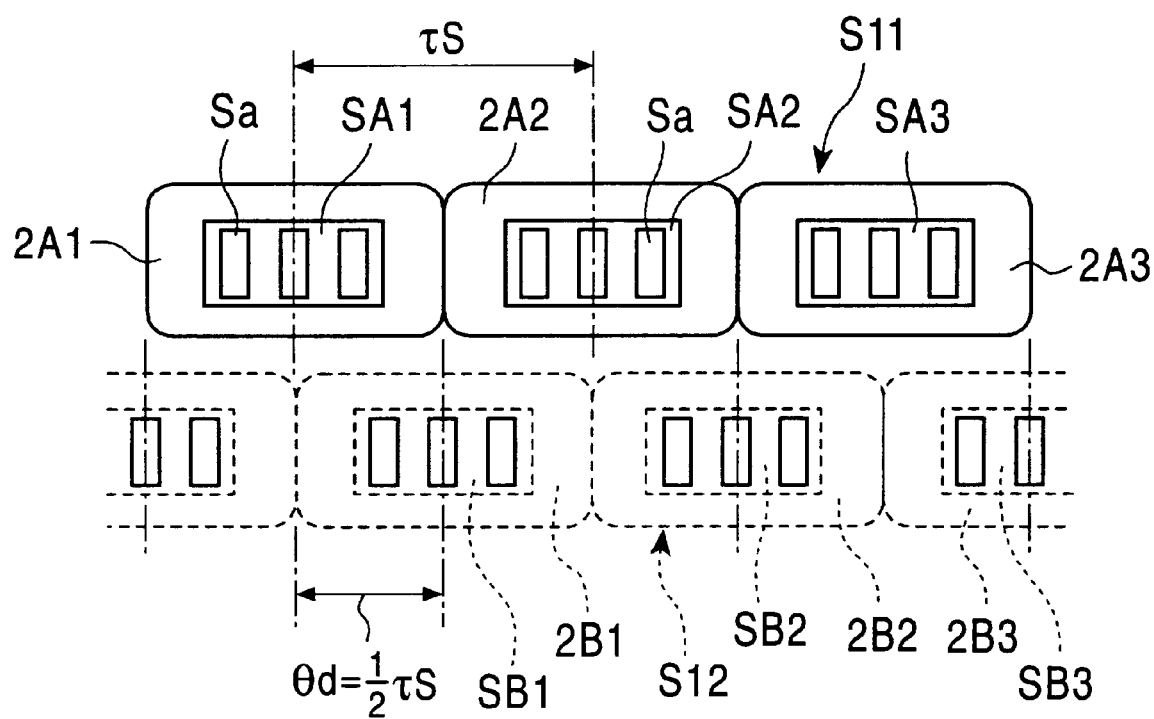
FIG. 18 is a developed view showing a relationship among the coils of two stator units included in the motor of the third embodiment.

The positional relationship among the magnetic poles SA1–SA3, SB1–SB3, the pole teeth Sa and the coils 2A1–2A3, 2B1–2B3 is shown in FIG. 18. The magnetic poles SA1, SA2 and SA3 are formed on the first stator unit S11 and the magnetic poles SB1, SB2 and SB3 are formed on the second stator unit S12. Illustration of the other magnetic poles is omitted in FIG. 18. Three pole teeth Sa having rectangular cross-section are formed on each of the magnetic poles of the stator units. The coils 2A1, 2A2, 2A3 and 2B1, 2B2, 2B3 wind the magnetic poles, respectively.

Assuming that the angular pitch between the air-core coils arranged in the same stator unit is equal to τS, the deviation angle between the air-core coil arranged on the first stator unit S11 and the air-core coil arranged on the second stator unit S12 is equal to (½)τS.

Figure 19A:
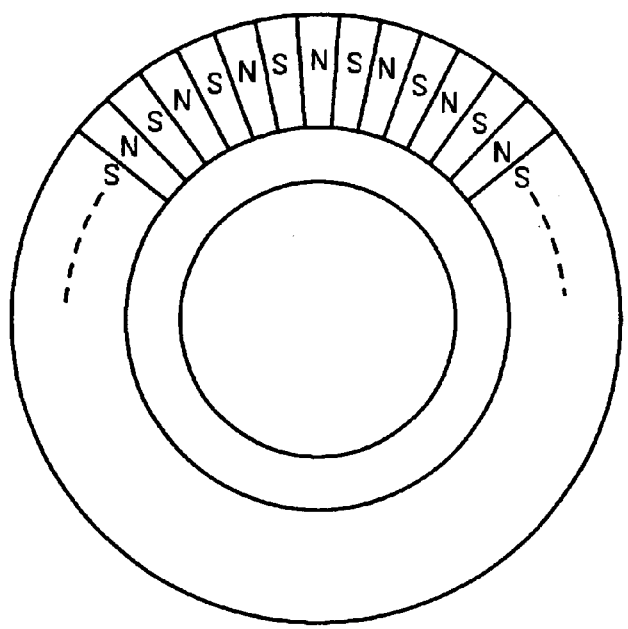
FIGS. 19A–19C show arrangements of permanent magnets of rotor units included in the motor of the third embodiment.
Figure 19B:
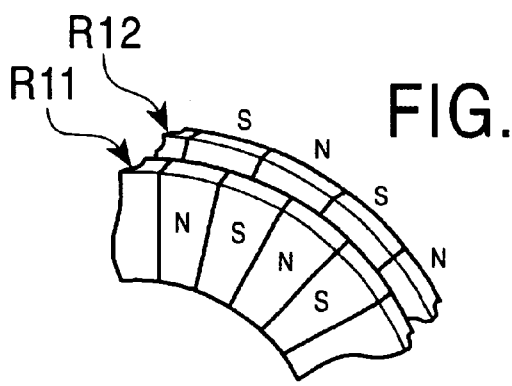
Figure 19C:
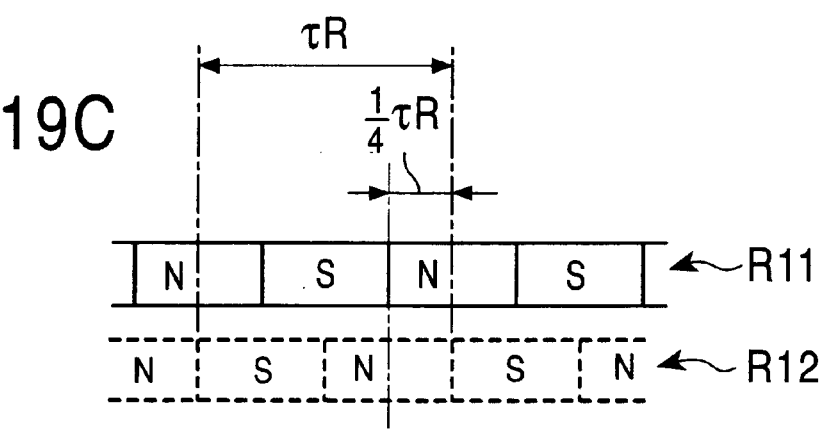

FIGS. 19A–19C show arrangements of the permanent magnets 4 of the rotor units R11 and R12 that correspond to the constructions of the stator units shown in FIG. 18. FIG. 19A is a front view of the rotor unit showing the arrangement of the N-poles and S-poles of the permanent magnet 4, FIG. 19B is a perspective view showing the relationship between the magnetic poles of the first and second rotor units R11 and R12, and FIG. 3C is a developed view of the permanent magnets of the first and second rotor units R11 and R12.

On each of the first and second rotor units R11 and R12, the N-poles and S-poles of the permanent magnet 4 are radially arranged corresponding to the surface shape and the pitch of the opposite magnetic poles of the stator unit. Further, a magnetic pole of the first rotor unit R11 and a magnetic pole of the second rotor unit R12 are deviated from each other by ¼ of the pitch τR between the closest pair of the magnetic poles having the same polarity as shown in FIG. 19C.

The magnetic pole number Pr that is a total number of N-poles and S-poles of each rotor unit satisfies the following equation (9);

$$Pr = m(4n+1) \pm 2 \tag{9}$$

where m is a phase number that is equal to or larger than 6, and n is an integer equal to or larger than 1.

Since the third embodiment provides a 6-phase motor, m=6. Accordingly, Pr=24n+4 or Pr=24n+8.

Figure 20:
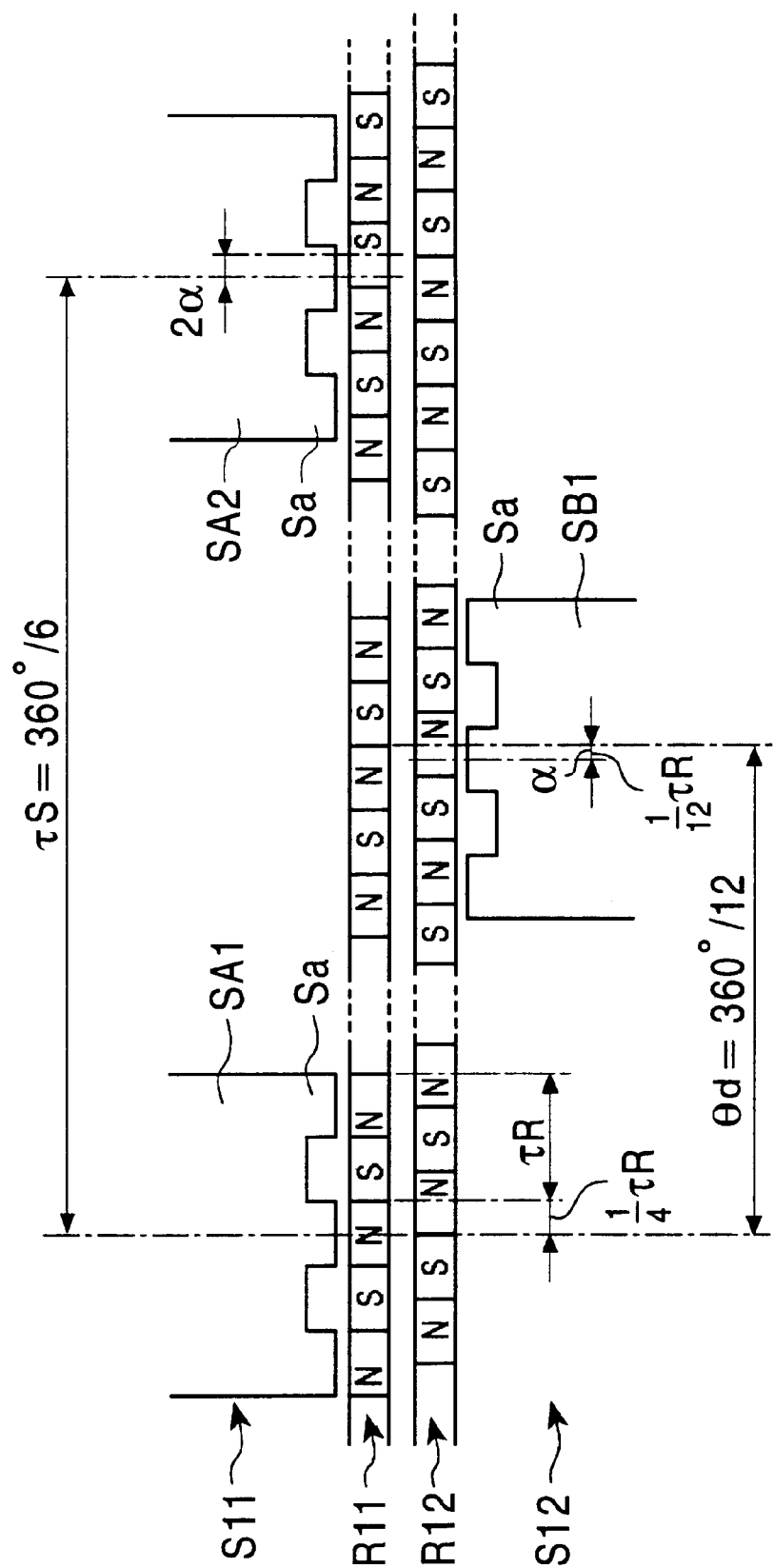
FIG. 20 is a developed view showing a relationship among the stator units and the rotor units in the third embodiment.

In FIG. 20, which is a developed view of the motor, S11 denotes the first stator unit, S12 denotes the second stator unit, R11 denotes the first rotor unit and R12 denotes the second rotor unit. References SA1 and SA2 are the magnetic poles formed on the first stator unit S11 that are wound by the coils 2A1 and 2A2 (not shown in FIG. 20). Three pole teeth Sa having rectangular cross-section are formed on each of the magnetic poles SA1 and SA2 at regular intervals. The other magnetic poles and the coils are not shown for the sake of simplicity.

A reference SB1 is the magnetic pole formed on the second stator unit S12 that is wound by the coil 2B1 (not shown in FIG. 20). Three pole teeth Sa having the same shape as that formed on the first stator unit S11 are formed on the magnetic pole SB1 at regular intervals.

In the third embodiment, since each stator unit includes six coils, the coil arrangement angular pitch tS, which is an angle between the magnetic poles (coils) arranged in the same stator unit, equals 360°/6=60°. The deviation angle between the magnetic pole (coil) arranged on the first stator unit S11 and the magnetic pole (coil) arranged on the second stator unit S12 is equal to 360°/12=30°.

Next, grounds of the above equation (9) will be described with reference to FIG. 20. As is evident from FIG. 20, the deviation angle θd is represented by the following equation (10):

$$\theta d = (¼)\tau R + n\tau R \pm \alpha \tag{10}$$

where α is a displacement angle that is determined by a difference between the magnetic pole pitch of the rotor unit and the magnetic pole pitch of the stator unit.

Further, n is an integer equal to or larger than 1, and τR is the angular pitch between the closest permanent magnets having the same polarity.

Accordingly, the angular pitch τPr between the adjacent permanent magnets having different polarities and the total number Pr of the permanent magnets of each rotor unit (the magnetic pole number) are represented by the equations (3) and (4), respectively, as described above.

$$\tau R = 2\tau Pr \tag{3}$$

$$\tau Pr = 2\pi / Pr \tag{4}$$

When the phase number m of the motor is equal to or larger than 6, the rotor of the motor of the third embodiment moves (rotates) by τR through 2m steps. Therefore, it is necessary that the displacement angle α satisfies the following equation (11):

$$\alpha = (½m)\tau R \tag{11}$$

Since θd=2π/2m, the equation (10) can be modified into the following equation (12):

$$(2\pi/2m) = (¼)\tau R + n\tau R \pm (½m)\tau R \tag{12}$$

Since τR=2τPr=4π/Pr is lead based on the equations (3) and (4), substituting this condition into the equation (12) yields the equation (9), which represents the relationship between the rotor magnetic pole and the phase number, after organization.

$$Pr = m(4n+1) \pm 2 \tag{9}$$

In this case, n is an integer satisfying n≧1, and m is an integer satisfying m≧6 as described above.

Since the motor of the third embodiment is a 6-phase motor, m=6 is substituted into the equation (9). As a result, the following general equations (13) and (14) are obtained.

$$Pr = 24n+8 \tag{13}$$

$$Pr = 24n+4 \tag{14}$$

Further, since α=(½m)τR, and θd=(2π/2m), the equations (15) and (16) stand for the 6-phase motor:

$$\theta d = 2\pi/12 = 360°/12 = 30° \tag{15}$$

$$\alpha = (1/12)\tau R \tag{16}$$

Further, since the deviation angle between the adjacent magnetic poles SA1 and SA2 is equal to 2θd, the deviation angle between any magnetic pole and the adjacent magnetic pole that are arranged on the first stator unit S11 is represented by the equation (17) and it can be shown as the magnetic pole SA2 in FIG. 20.

$$2\theta d = (½)\tau R + 2n\tau R \pm 2\alpha \tag{17}$$

In the same manner, the deviation angle between the magnetic pole SA1 and the magnetic pole SB2 (not shown) is represented by the equation (18):

$$3\theta d = (¾)\tau R + 3n\tau R \pm 3\alpha \tag{18}$$

Therefore, the deviation angle between the magnetic pole of the stator unit and the angular pitch of the magnetic pole of the rotor unit increases by multiple of α as shown in the equations (17) and (18).

The connection of the coils of the 6-phase motor according to the third embodiment is the same as that shown in FIG. 5, the driving circuit for the single-phase excitation is identical to that shown in FIG. 6, and the excitation sequence is identical to that shown in FIG. 7.

Figure 21:
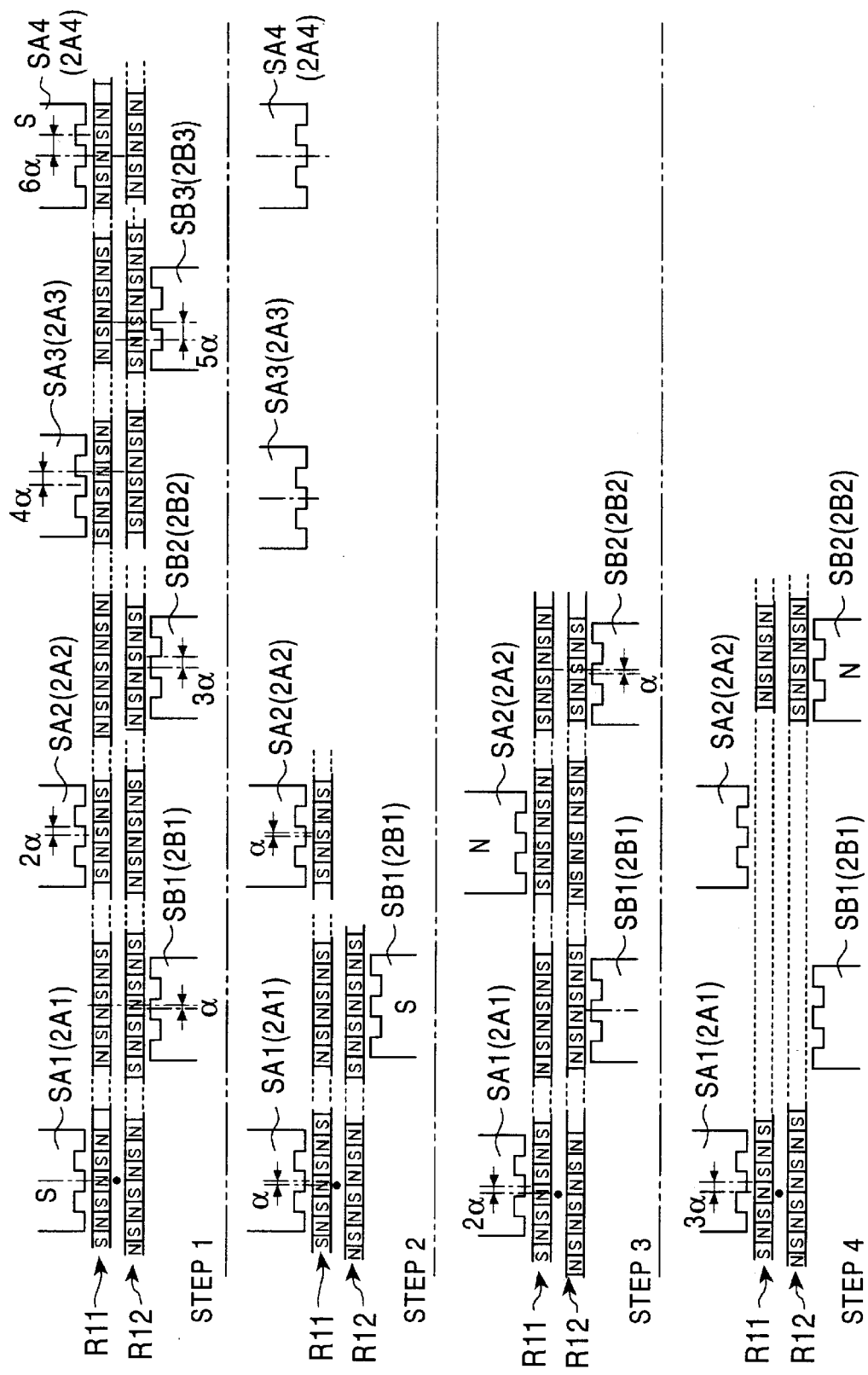
FIG. 21 is a developed view showing the secular change of the relationship between the magnetic poles of the stator and the magnetic poles of the rotor when the motor of the third embodiment is driven according to the excitation sequence of FIG. 7.

Next, the rotation of the motor according to the above-described excitation sequence will be described in detail with reference to FIG. 21. FIG. 21 is a developed view showing the secular change of the motor shown in FIG. 20 when the motor is driven according to the excitation sequence of FIG. 7.

At the uppermost potion in FIG. 21, the positional relationship between the magnetic poles of the stator units and the magnetic poles of the rotor units in step 1 shown in FIG. 7 is shown.

However, the illustration of the magnetic poles after SA4 and after SB3 are omitted.

Black dots marked on the same N-pole of the first rotor unit R11 show the movement (rotation) of the rotor units according to the excitation steps.

In step 1, the magnetic poles SA1 and SA4 of the first stator unit S11 are excited in S-pole by the passage of electric current through the coils 2A1 and 2A4 in the normal direction. And thus, the N-poles of the first rotor unit R11 are attracted by the magnetic poles SA1 and SA4 and are moved to the opposite positions, respectively.

In step 2, the magnetic poles SB1 and SB4 (not shown) of the second stator unit S12 are excited in S-pole by the passage of electric current through the coils 2B1 and 2B4 (not shown) in the normal direction. And thus, the N-poles of the second rotor unit R12 are attracted by the magnetic poles SB1 and SB4 and are moved to the opposite positions, respectively. Accordingly, the rotor units move (rotate) by $\alpha$ from the position at step 1.

In step 3, the magnetic poles SA2 and SA5 (not shown) of the first stator unit S11 are excited in N-pole by the passage of electric current through the coils 2A2 and 2A5 in the reverse direction. And thus, the S-poles of the first rotor unit R11 are attracted by the magnetic poles SA2 and SA5 and are moved to the opposite positions, respectively. Accordingly, the rotor units move (rotate) by $\alpha$ from the position at step 2.

In step 4, the magnetic poles SB2 and SB5 of the second stator unit S12 are excited in N-pole by the passage of electric current through the coils 2B2 and 2B5 in the reverse direction. And thus, the S-poles of the second rotor unit R12 are attracted by the magnetic poles SB2 and SB5 and are moved to the opposite positions, respectively. Accordingly, the rotor units move (rotate) by $\alpha$ from the position at step 3.

The motor rotates by the step angle $\alpha(=\pi/24$ in this embodiment) at every step. The motor continues to rotate by repeating the steps shown in FIG. 7.

When the 6-phase motor of the third embodiment is driven by the multi-phase excitation, the driving circuit shown in FIG. 9 or FIG. 10 can be used and the excitation sequence by the 4-phase excitation is the same as that shown in FIG. 11.

Fourth Embodiment

A motor of a fourth embodiment will be described next. The motor of the fourth embodiment is a 10-phase motor that is constructed as a combination of first and second 5-phase motor units having ten coils, respectively.

The basic construction of the 10-phase motor of the fourth embodiment is the same as the 6-phase motor of the third embodiment. A number of the coils and a number of the magnetic poles are increased.

The magnetic pole number Pr that is a total number of N-poles and S-poles of the 10-phase motor is obtained by substituting m=10 into the equation (9) as follows:

$$Pr=40n+12$$

$$Pr=40n+8$$

Further, since $\alpha=(\frac{1}{2}m)\tau R$, $\theta d=(2\pi/2m)$ as described in the equation (11), $\theta d=2\pi/20=360°/20=18°$ and $\alpha=(\frac{1}{20})\tau R$ for the 10-phase motor.

Since the principal construction of the motor of the fourth embodiment is similar to the 6-phase motor of the third embodiment, a detail description is omitted.

Figure 22:
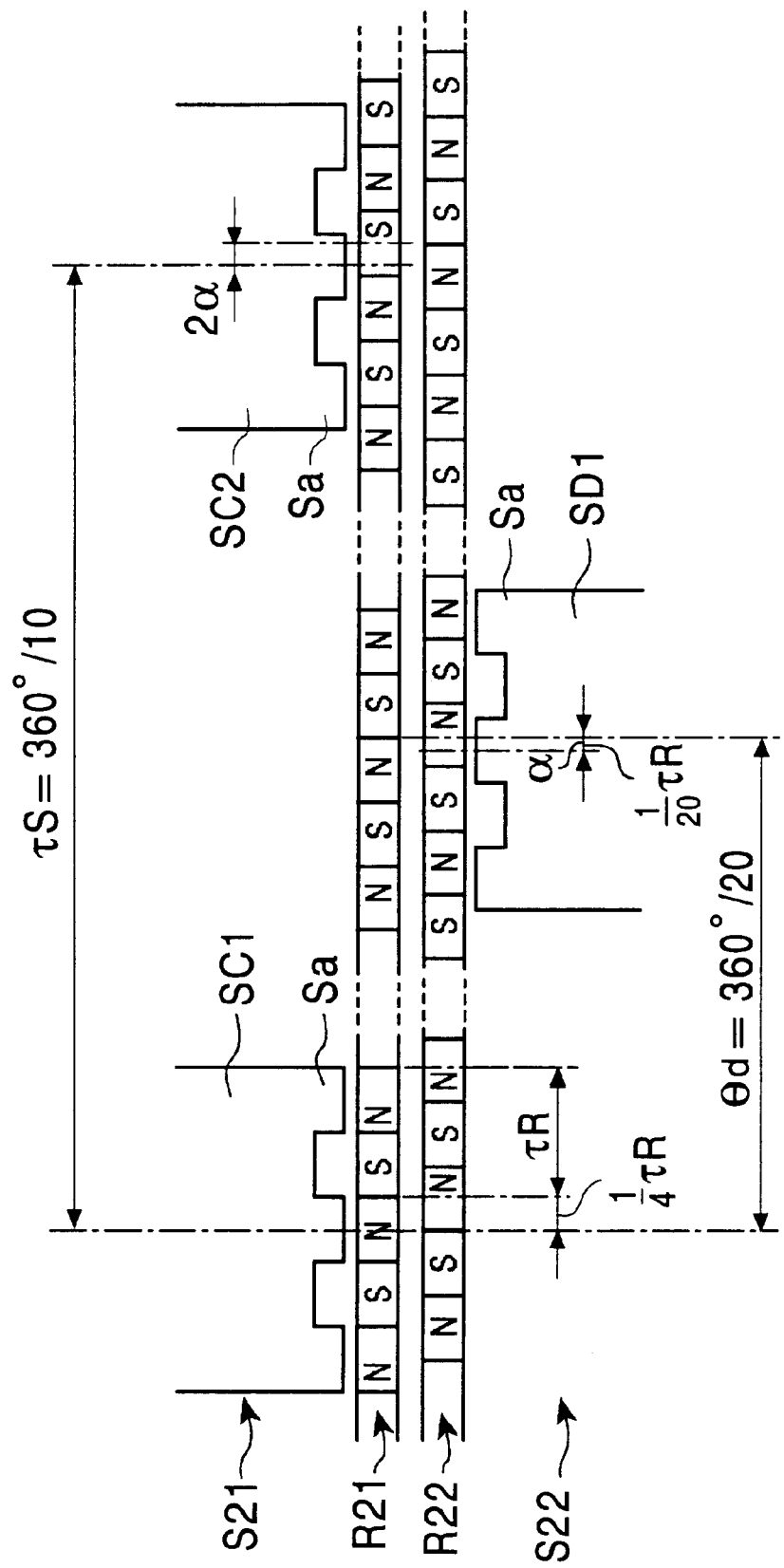
FIG. 22 is a developed view showing a relationship among the stator units and the rotor units included in a 10-phase flat-type PM stepping motor according to a fourth embodiment.
Figure 23:
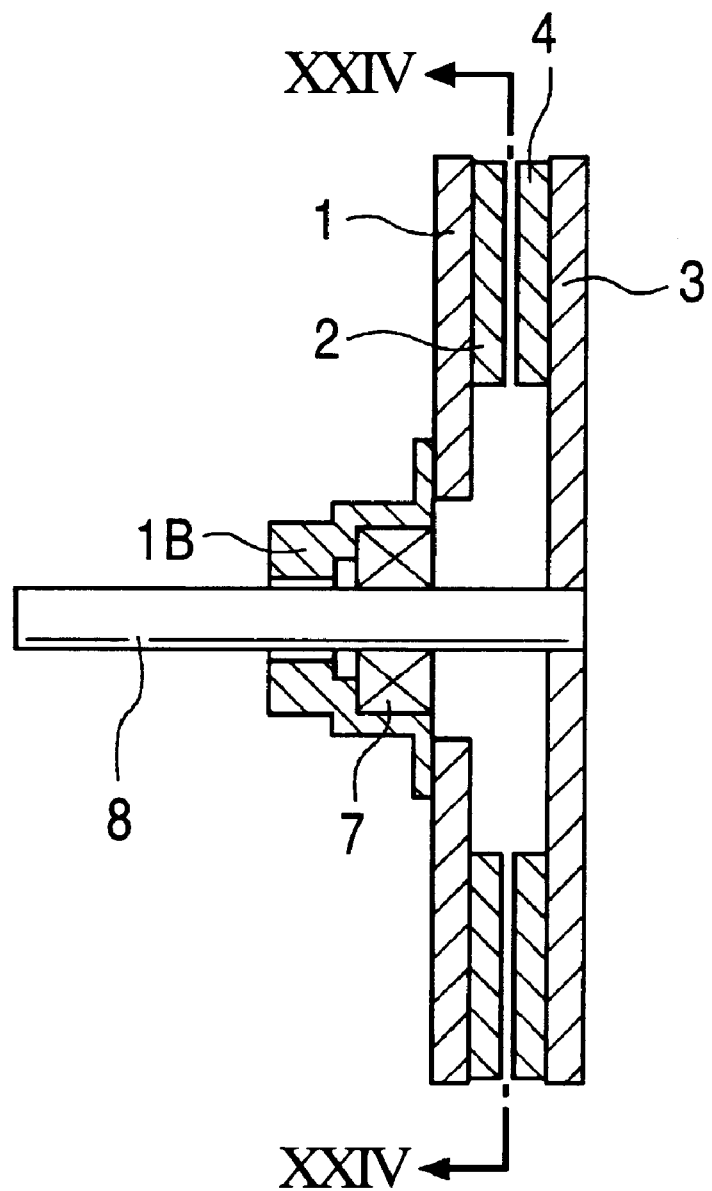
FIG. 23 is a vertical section side view showing a schematic construction of a conventional multi-phase flat-type PM stepping motor.
Figure 24:
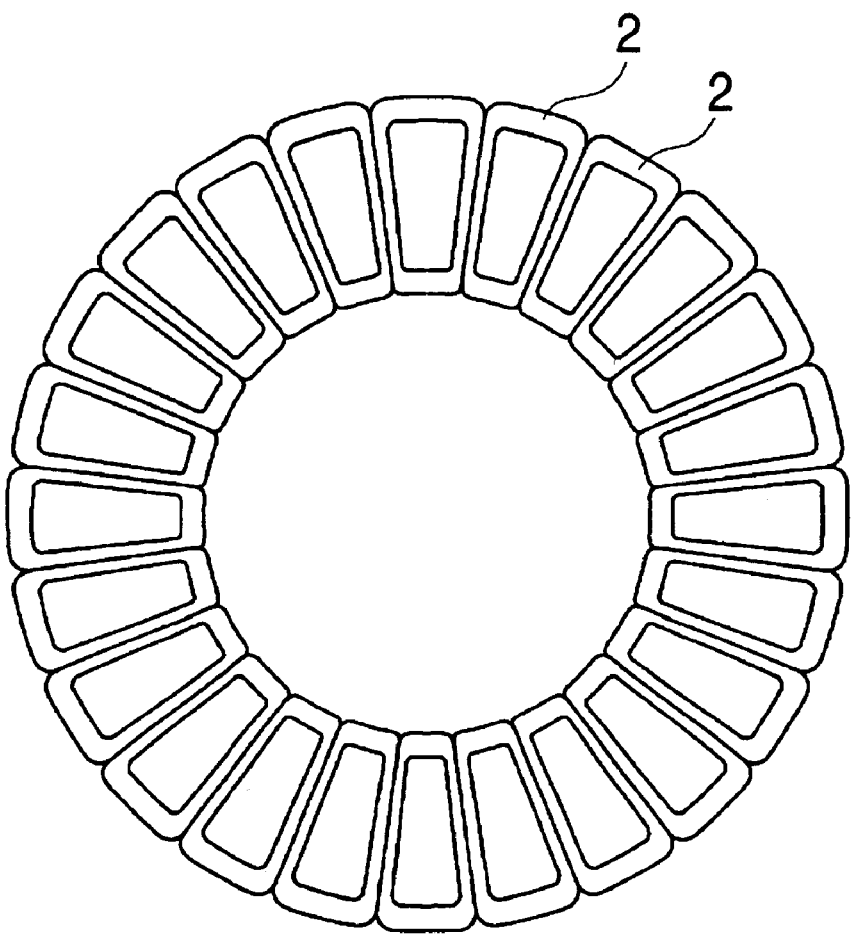
FIG. 24 is a front view showing an arrangement of stator coils of the conventional motor viewed from a XXIV—XXIV line in FIG. 23.
Figure 25:
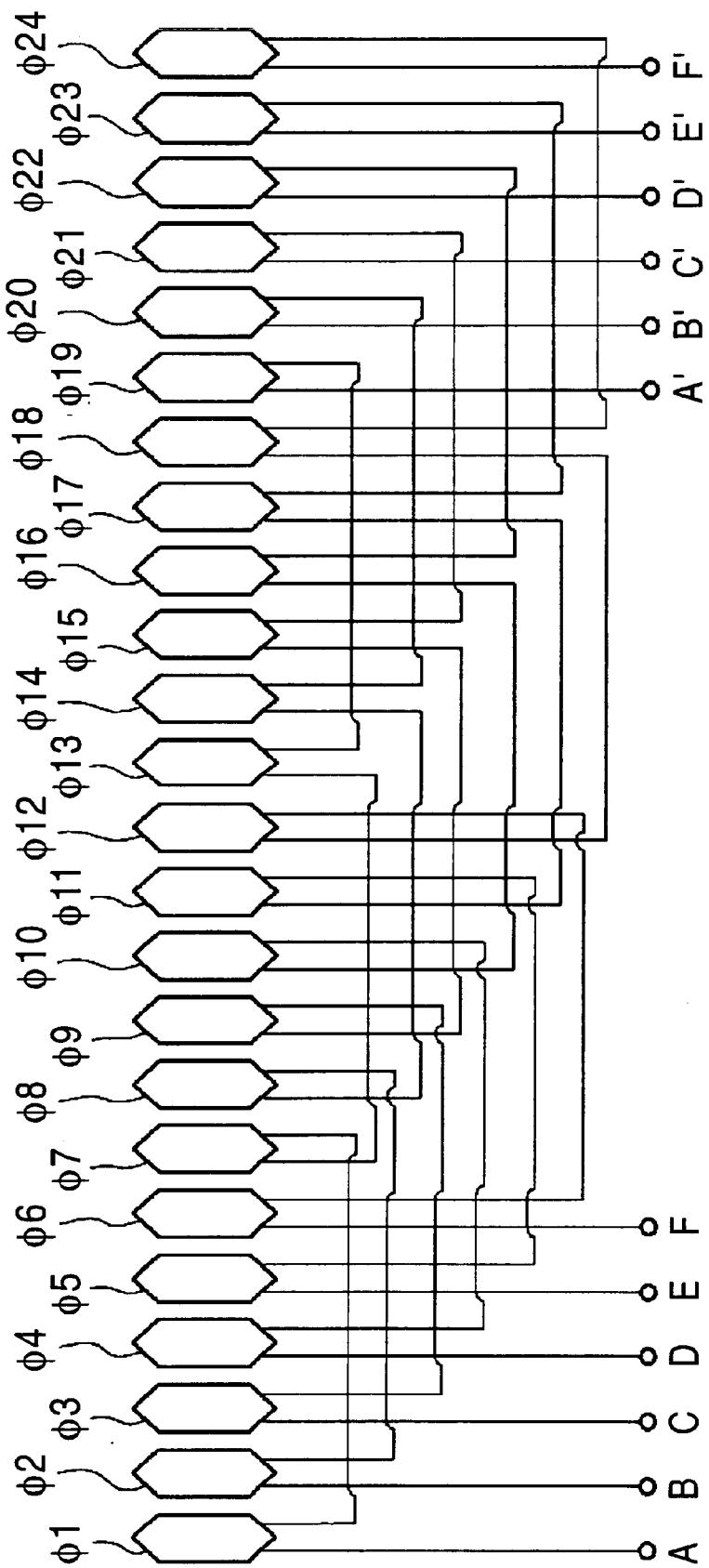
FIG. 25 is a connection diagram of the stator coils of the conventional 6-phase flat-type PM stepping motor.
Figure 26:
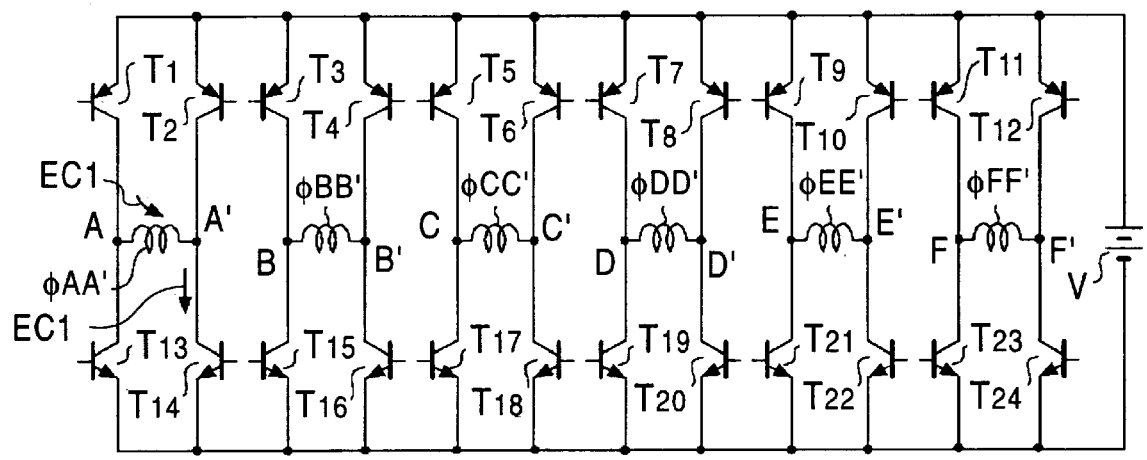
FIG. 26 shows a driving circuit for driving the stator coils of the conventional motor shown in FIG. 25.
Figure 27:
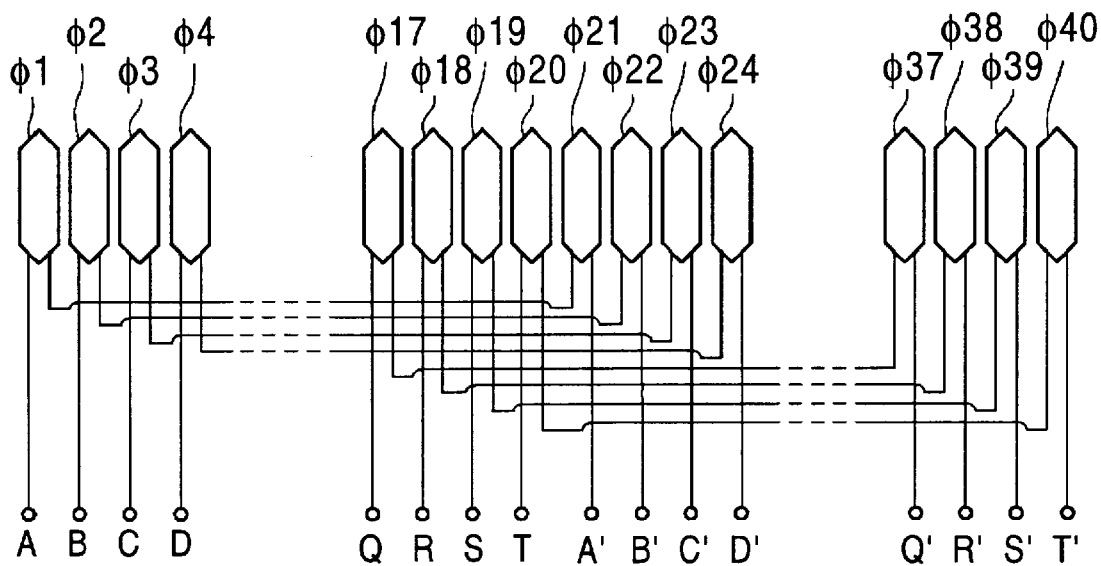
FIG. 27 is a connection diagram of the stator coils of the conventional 10-phase flat-type PM stepping motor.
Figure 28:
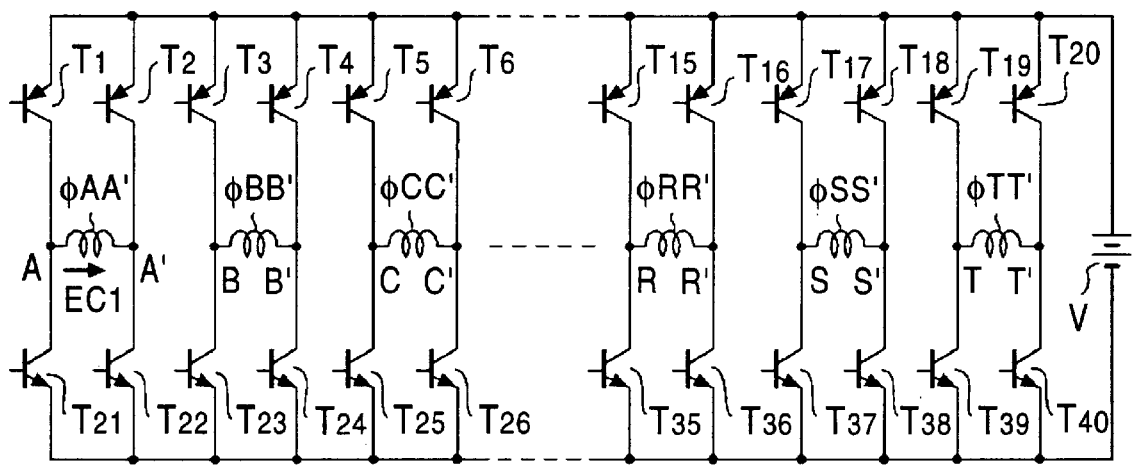
FIG. 28 shows a driving circuit for driving the stator coils of the conventional motor shown in FIG. 27.

The developed view shown in FIG. 20 for the 6-phase motor is modified to FIG. 22 because the coil arrangement angular pitch $\tau S$ equals 360°/10.

The connection of the coils of the 10-phase motor according to the fourth embodiment is the same as that shown in FIG. 12 and the excitation sequence is identical to that shown in FIG. 13. The driving circuit is similar to that for the 6-phase motor, four switching elements form bridge connection for each phase and each terminal of the coil groups is connected to the intermediate point of the serial connection. Therefore, the illustration and the description of the driving circuit is omitted.

When the 10-phase motor of the fourth embodiment is driven by the multi-phase excitation, the driving circuit shown in FIG. 14 or FIG. 15 can be used and the excitation sequence by the 8-phase excitation is the same as that shown in FIG. 16.

The motors and the driving circuits described in the third and fourth embodiments are examples of the present invention and any variations are available corresponding to use and condition.

For example, while the embodiments only touches the practical 6-phase and 10-phase motors, the present invention can be applied to a motor of an integral multiple of 6-phase and a motor of an integral multiple of 10-phase. This is a reason why claim 12 does not limit the phase number and the magnetic pole number.

When the present invention is applied to the motor of an integral multiple of 6-phase or 10-phase, the magnetic pole number is determined based on the equation (9) $Pr=m(4n+1)\pm 2$. A number of coils of a stator unit is determined corresponding to the magnetic pole number Pr. Further, the displacement angle $\alpha$ can be determined by $\alpha=(\frac{1}{2}m)\tau R$.

Since the multi-phase flat-type PM stepping motor and the driving circuit thereof according to the third and fourth embodiments are constituted as above, they have the following superior effects.

(1) Since the magnetic coupling between the stator unit and the rotor unit is in the axial direction, the thickness of the motor in the axial direction can be largely reduced as compared with a hybrid stepping motor that is formed by stacking iron cores.

(2) Since the magnetic pole of the stator has the pole teeth to increase the phase, a microscopic step angle can be obtained even through it is a flat-type motor.

(3) Since the driving circuit of the multi-phase flat-type PM stepping motor of the invention can connect the coil groups of the respective motor units as a star connection or can connect all of the coil groups of the first and second motor units to enable a multi-phase excitation, a number of the switching elements can be decreased, which simplifies the driving circuit and reduces the cost.

(4) Accordingly, the multi-phase excitation of the invention can cut a number of switching elements forming a driving circuit in half as compared with a prior art. For instance, a 6-phase motor requires 12 switching elements and a 10-phase motor requires 20 switching elements, which sharply reduces the cost.

(5) The invention enables a low cost multi-phase excitation, which increases output torque with reducing vibration.

(6) The driving circuit designed as above can be used as a driving circuit of a brushless motor, which reduces the cost from the viewpoint of productivity.

(7) As a result of the above, the multi-phase flat type PM stepping motor of the present invention is suitable for a low-profile motor used in OA equipment, which requires low-vibration and low-noise during high speed operation, such as a printer, a high speed facsimile or a PPC copying machine.

What is claimed is:

1. A multi-phase flat-type PM stepping motor, comprising:
   a first motor unit that comprises:
      a first stator unit having a plurality of air-core coils that are radially arranged on a first isolating magnetic disc; and
      a first rotor unit having a plurality of permanent magnets that are alternatively magnetized in N-pole and S-pole and radially arranged on a second magnetic disc with a predetermined air gap with respect to the coil surface of said first stator unit; and
   a second motor unit that comprises:
      a second stator unit having a plurality of air-core coils that are radially arranged on a third isolating magnetic disc; and
      a second rotor unit having a plurality of permanent magnets that are alternatively magnetized in N-pole and S-pole and radially arranged on a fourth magnetic disc with a predetermined air gap with respect to the coil surface of said second stator unit,
   wherein said first and second motor units are coaxial and symmetric with each other about a non-magnetic disc arranged therebetween.

2. The multi-phase flat-type PM stepping motor according to claim 1, wherein said coils arranged on said first stator unit are deviated from said coils arranged on said second stator unit by ½ of the coil arrangement angular pitch, and said permanent magnets arranged on said first rotor unit are deviated from said permanent magnets arranged on said second rotor unit by ¼ of the angular pitch of the magnetic poles having the same polarity.

3. The multi-phase flat-type PM stepping motor according to claim 1, wherein the total number Pr of said N-poles and S-poles of each rotor unit satisfies the following equation:

$$Pr=m\pm2$$

where m is a phase number.

4. The multi-phase flat-type PM stepping motor according to claim 1, wherein each of said first and second stator units has six air-core coils to form a 6-phase motor.

5. The multi-phase flat-type PM stepping motor according to claim 1, wherein each of said first and second stator units has ten air-core coils to form a 10-phase motor.

6. A driving circuit for the multi-phase flat-type PM stepping motor according to one of claims 1 through 5, wherein the respective opposite air-core coils are serially connected to form a plurality of coil groups, and terminals at one side of said coil groups are connected to each other for each of said first and second stator units to permit plural phase excitation.

7. The driving circuit according to claim 6, wherein the connection point of said coil groups arranged on said first stator unit is connected to the connection point of said coil groups arranged on said second stator unit.

8. The driving circuit according to claim 6, wherein terminals at the side opposite to the connection point of said coil groups are connected to connection points of serially connected switching elements, respectively.

9. A multi-phase flat-type PM stepping motor, comprising:
   a first motor unit that comprises:
      a first stator unit providing a plurality of magnetic poles that are radially arranged on a first isolating magnetic disc, each of said magnetic poles having pole teeth on the top thereof and being wound by a coil; and
      a first rotor unit having a plurality of permanent magnets that are alternatively magnetized in N-pole and S-pole and radially arranged on a second magnetic disc at the pitch corresponding to the pitch of said pole teeth with a predetermined air gap with respect to the magnetic pole surface of said first stator unit; and
   a second motor unit that comprises:
      a second stator unit providing a plurality of magnetic poles that are radially arranged on a third isolating magnetic disc, each of said magnetic poles having pole teeth on the top thereof and being wound by a coil; and
      a second rotor unit having a plurality of permanent magnets that are alternatively magnetized in N-pole and S-pole and radially arranged on a fourth magnetic disc at the pitch corresponding to the pitch of said pole teeth with a predetermined air gap with respect to the magnetic pole surface of said second stator unit,
   wherein said first and second motor units are coaxial and symmetric with each other about a non-magnetic disc arranged therebetween.

10. The multi-phase flat-type PM stepping motor according to claim 9, wherein each of said pole teeth is a projection whose sectional shape is rectangular, a predetermined number of said pole teeth are radially formed on each of said magnetic poles at a predetermined pitch.

11. The multi-phase flat-type PM stepping motor according to claim 9, wherein said coils arranged on said first stator unit are deviated from said coils arranged on said second stator unit by ½ of the coil arrangement angular pitch, and said permanent magnets arranged on said first rotor unit are deviated from said permanent magnets arranged on said second rotor unit by ¼ of the angular pitch of the magnetic poles having the same polarity.

12. The multi-phase flat-type PM stepping motor according to claim 9, wherein the total number Pr of said N-poles and S-poles of each rotor unit satisfies the following equation:

$$Pr=m(4n+1)\pm2$$

where m is a phase number that is equal to or larger than 6, and n is an integer equal to or larger than 1.

13. The multi-phase flat-type PM stepping motor according to claim 9, wherein each of said first and second stator units has six magnetic poles to form a 6-phase motor.

14. The multi-phase flat-type PM stepping motor according to claim 9, wherein each of said first and second stator units has ten magnetic poles to form a 10-phase motor.

15. A driving circuit for the multi-phase flat-type PM stepping motor according to one of claims 9 through 14, wherein the respective opposite coils are serially connected to form a plurality of coil groups, and terminals at one side of said coil groups are connected to each other for each of said first and second stator units to permit plural phase excitation.

16. The driving circuit according to claim 15, wherein the connection point of said coil groups arranged on said first stator unit is connected to the connection point of said coil groups arranged on said second stator unit.

17. The driving circuit according to claim 15, wherein terminals at the side opposite to the connection point of said coil groups are connected to connection points of serially connected switching elements, respectively.

* * * * *